US012558848B2

(12) United States Patent
Miller

(10) Patent No.: US 12,558,848 B2
(45) Date of Patent: Feb. 24, 2026

(54) METHOD AND APPARATUS FOR PRINTING THREE-DIMENSIONAL STRUCTURES WITH IMAGE INFORMATION

(71) Applicant: NIKE, Inc., Beaverton, OR (US)

(72) Inventor: Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/156,884

(22) Filed: Jan. 19, 2023

(65) Prior Publication Data

US 2023/0150206 A1 May 18, 2023

Related U.S. Application Data

(63) Continuation of application No. 16/722,498, filed on Dec. 20, 2019, now Pat. No. 11,584,084, which is a
(Continued)

(51) Int. Cl.
*B29C 64/386* (2017.01)
*B29C 64/112* (2017.01)
(Continued)

(52) U.S. Cl.
CPC .......... *B29C 64/386* (2017.08); *B29C 64/112* (2017.08); *B29C 64/393* (2017.08);
(Continued)

(58) Field of Classification Search
CPC ......... B33Y 10/00; B33Y 30/00; B33Y 50/00; B33Y 50/02; B33Y 80/00; A43B 23/0235;
(Continued)

(56) References Cited

U.S. PATENT DOCUMENTS 5,400,573 A *  3/1995  Crystal ................ B41J 2/17506
                                                      141/2
10,518,474 B2 * 12/2019 Miller .................. B29C 64/112
                        (Continued)

FOREIGN PATENT DOCUMENTS

CN        104284770        1/2015
CN        105308237        2/2016
                (Continued)

OTHER PUBLICATIONS

Definition of "refill" from Cambridge Dictionary Jul. 24, 2024.*
International Search Report and Written Opinion for related International Application No. PCT/US2017/035140, mailed Sep. 19, 2017, 13 pages.
(Continued)

*Primary Examiner* — John L Goff, II
(74) *Attorney, Agent, or Firm* — Klarquist Sparkman, LLP

(57) ABSTRACT

A method and system for printing 3D structures using 2D monochromatic images (for example, greyscale images) is provided. The method can include instructing a printing device to print a 2D monochromatic image using print material in a reservoir known to contain a structural print material to create a three-dimensional structure. The method can further include instructing the printing device to print a 2D color image using color print material in a reservoir known to contain color print material, thereby forming an inner or an outer color layer of the three-dimensional structure.

14 Claims, 20 Drawing Sheets

Related U.S. Application Data continuation of application No. 15/609,220, filed on May 31, 2017, now Pat. No. 10,518,474.

(60) Provisional application No. 62/343,686, filed on May 31, 2016.

(51) Int. Cl.

| | |
|---|---|
| *B29C 64/393* | (2017.01) |
| *B33Y 10/00* | (2015.01) |
| *B33Y 30/00* | (2015.01) |
| *B33Y 50/02* | (2015.01) |
| *B33Y 80/00* | (2015.01) |
| *H04N 1/407* | (2006.01) |
| *B29L 31/50* | (2006.01) |

(52) U.S. Cl.
CPC ............... *B33Y 10/00* (2014.12); *B33Y 30/00* (2014.12); *B33Y 50/02* (2014.12); *B33Y 80/00* (2014.12); *H04N 1/4078* (2013.01); *B29K 2995/002* (2013.01); *B29L 2031/50* (2013.01)

(58) Field of Classification Search
CPC ................ A43B 23/024; A43B 23/026; A43B 23/0245; B29C 64/393; B29C 64/386; B29C 64/10; B29C 64/112; B29C 64/00; B29C 64/20; B29C 64/30; H04N 1/4078; H04N 1/1092; B29L 2031/50
USPC ........................................................ 264/308
See application file for complete search history.

(56) References Cited

U.S. PATENT DOCUMENTS

| | | | |
|---|---|---|---|
| 2003/0026460 A1* | 2/2003 | Conrad .................. | G06T 7/507 |
| | | | 382/114 |
| 2004/0080078 A1 | 4/2004 | Collins | |
| 2004/0183796 A1 | 9/2004 | Velde et al. | |
| 2006/0127153 A1* | 6/2006 | Menchik ................ | B33Y 30/00 |
| | | | 400/62 |
| 2007/0260349 A1 | 11/2007 | John et al. | |
| 2013/0095302 A1 | 4/2013 | Pettis et al. | |
| 2014/0020191 A1 | 1/2014 | Jones et al. | |
| 2014/0084517 A1 | 3/2014 | Sperry et al. | |
| 2015/0002567 A1 | 1/2015 | Miller | |
| 2015/0093552 A1 | 4/2015 | Biskop et al. | |
| 2015/0258770 A1 | 9/2015 | Chan et al. | |
| 2017/0341304 A1 | 11/2017 | Miller | |

FOREIGN PATENT DOCUMENTS

| | | |
|---|---|---|
| JP | H 06-226862 | 8/1994 |
| JP | 2004-203031 | 7/2004 |
| JP | 2007-298990 | 11/2007 |
| JP | 2015-186891 | 10/2015 |
| WO | WO 2015/161093 | 10/2015 |
| WO | WO 2016/068833 | 5/2016 |

OTHER PUBLICATIONS

Notification of Reasons for Refusal for related JP Application No. 2018-562189, 7 pages, mailed Jan. 30, 2020.
Chinese Office Action for related Application No. 201780034064.5, mailed May 19, 2020, 13 pages.
Korean Office Action (w/ Eng. translation) for related Application No. 10-2018-7038082, mailed May 28, 2020, 13 pages.

* cited by examiner

RECEIVE MAXIMUM
HEIGHT OF STRUCTURE ~1502

DETERMINE FIXED
NUMBER OF LAYERS ~1504

RECEIVE GRADIENT DATA
WITH SHADE LEVELS ~1506

DETERMINE PERCENTAGE OF
LAYER THICKNESS OF EACH
LOCATION ACCORDING
TO SHADE LEVELS ~1508

PRINT A RANGE OF
SPOT COLOR PERCENTAGES
ONTO A SUBSTRATE IN
DIFFERENT REGIONS ⎯ 1902

MEASURE THICKNESSES
OF PRINTED REGIONS ⎯ 1904

COMPARE MEASURED
THICKNESSES TO PREDETERMINED
TARGET THICKNESSES ⎯ 1906

GENERATE CORRECTED TABLE OF
SPOT COLOR PERCENTAGES
TO ACHIEVE PREDETERMINED
TARGET THICKNESSES ⎯ 1908

USE CORRECTED TABLE
FOR PRINTING ⎯ 1910

METHOD AND APPARATUS FOR PRINTING THREE-DIMENSIONAL STRUCTURES WITH IMAGE INFORMATION

CROSS-REFERENCE TO RELATED APPLICATIONS

This application is a continuation of U.S. patent application Ser. No. 16/722,498, filed Dec. 20, 2019, now U.S. Pat. No. 11,584,084, which claims the benefit of U.S. patent application Ser. No. 15/609,220, filed May 31, 2017, now U.S. Pat. No. 10,518,474, which claims the benefit of U.S. Provisional Patent Application No. 62/343,686, filed May 31, 2016, each of which is incorporated by reference herein in their entirety.

BACKGROUND

The present embodiments relate generally to printing systems, including three-dimensional printing systems and methods.

Printing systems can be used to print 2D structures or layers of ink as well as 3D structures formed from various kinds of 3D printing materials. Three-dimensional printing systems and methods may be associated with various technologies including fused deposition modeling (FDM), electron beam freeform fabrication (EBF), selective laser sintering (SLS) as well as other kinds of three-dimensional printing technologies.

Structures formed from three-dimensional printing systems can be used with objects formed by other manufacturing techniques. These include textile materials used in various articles of footwear and/or articles of apparel.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

The embodiments provide a method and apparatus for printing three-dimensional structures (also referred to as three-dimensional structural components, 3D structures, etc.) onto a base (e.g., an article such as a part of an upper in an article of footwear, a textile layer, or other structure). The method may include receiving image information at a printing system. The image information can include information about a greyscale image, or more broadly a monochromatic image, that includes pixels of various shade levels between two colors (e.g., grey shade levels between black and white for a greyscale image). Using this information, a processing system of the printing system may generate instructions for a printing device that allow the printing device to print a 3D structure onto a base according to the shade levels of the pixels in the greyscale (or monochromatic) image. In some cases, the processing system can provide instructions in the form of a specific shade level for a given color (e.g., 50% black) to be printed from a designated reservoir that is known by the processing system to include a structural print material. The system can receive both greyscale images and color images. In some cases, color images may be used to print 2D color layers under and/or above a 3D structure that has been printed according to the greyscale image.

It may be appreciated that the embodiments are not limited to use with greyscale images for printing 3D structures. The methods described herein could be used with any 2D monochromatic file, which includes a single value, or sample, for each pixel. Thus, for example, a monochromatic image file with shades or hues of red could also be used as the basis for printing a 3D structure having greater height in darker (red) regions. As used in this detailed description and in the claims, therefore, monochromatic image is used to designate both greyscale images and images with hues or shades of only a single color (e.g., red, blue, etc.).

Other systems, methods, features, and advantages of the embodiments will be, or will become, apparent to one of ordinary skill in the art upon examination of the following figures and detailed description. It is intended that all such additional systems, methods, features, and advantages be included within this description, be within the scope of the embodiments, and be protected by the following claims.

Figure 1:
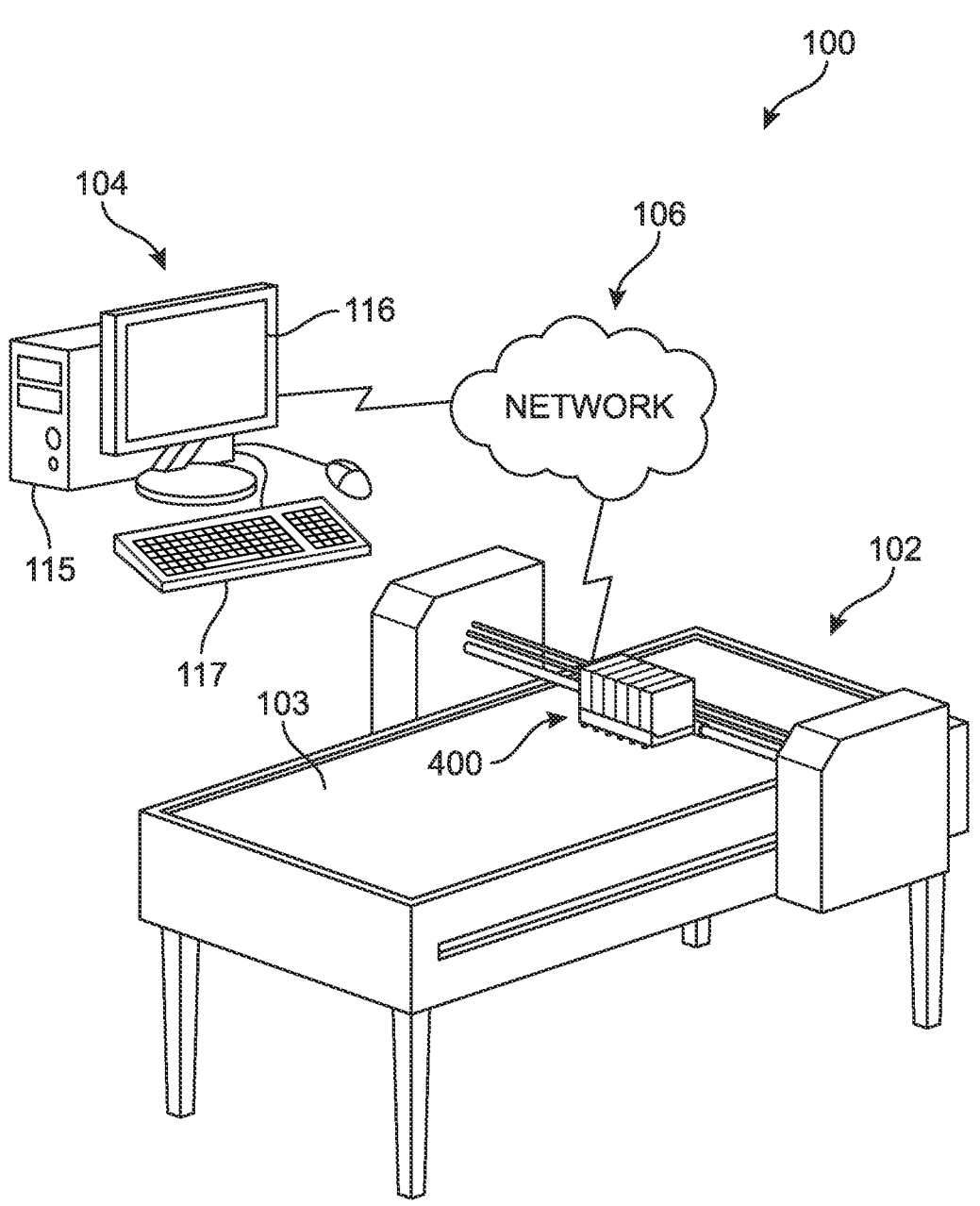
FIG. 1 is a schematic view of an embodiment of a printing system including a printing device and a computing system.

FIG. 1 is a schematic view of an embodiment of three-dimensional printing system 100, also referred to simply as printing system 100. Some embodiments of the printing system can include provisions that distribute one or more functions among different devices of the printing system. As shown, printing system 100 may include printing device 102, computing system 104, and network 106. In other embodiments, the printing system may be a single device or component (not shown).

As used herein, the terms "printer," "plotter," "three-dimensional printer," or "three-dimensional printing system" may refer to any type of system that can print multiple layers onto a substrate, a fabric, an article of footwear, an article of apparel, or other article. In one embodiment, printing device 102 could be a sign and graphics printer.

Printing system 100 may utilize various types of printing techniques. These can include, but are not limited to, toner-based printing, liquid inkjet printing, solid ink printing, dye-sublimation printing, inkless printing (including thermal printing and UV printing), MicroElectroMechanical Systems (MEMS) jet printing technologies as well as any other methods of printing.

Some embodiments may use additive manufacturing techniques or three-dimensional printing techniques. Three-dimensional printing, or "3D printing," comprises various technologies that may be used to form three-dimensional objects by depositing successive layers of material on top of one another. Exemplary 3D printing technologies that could be used include, but are not limited to, fused filament fabrication (FFF), electron beam freeform fabrication (EBF), direct metal laser sintering (DMLS), electron beam melting (EMB), selective laser melting (SLM), selective heat sintering (SHS), selective laser sintering (SLS), plaster-based 3D printing (PP), laminated object manufacturing (LOM), stereolithography (SLA), digital light processing (DLP) as well as various other kinds of 3D printing or additive manufacturing technologies known in the art. Structures formed from three-dimensional printing systems can be used with objects formed by other manufacturing techniques. These include textile materials used in various articles of footwear, articles of apparel, and/or protective articles.

Some of the exemplary embodiments depict printing three-dimensional structures onto an article (e.g., an upper for footwear); however, other embodiments may utilize the principles discussed herein for printing and curing print material for any application. In some other embodiments, for example, the principles discussed herein could be used to print and cure thin films or layers of print material, such as may be used in printing a graphic or indicia onto a substrate. As used in this detailed description and in the claims, the term "printable feature" refers to any layer, portion, or structure formed by printing (e.g., ejection from a nozzle). In some cases, a printable feature may be one or more layers of ink, as may be deposited by a conventional inkjet printer. In other cases, a printable feature could be a 3D structural feature that has been printed onto a substrate using a structural print material, such as thermoplastic materials.

In some cases, printing system 100 may make use of a combination of two or more different printing techniques. For example, in some embodiments, coloring inks may be printed as thin layers while clear or opaque print materials may be printed to form structural layers of a printed object or form. The type of printing technique used may vary according to factors including, but not limited to, material of the target article, size, and/or geometry of the target article, desired properties of the printed image (such as durability, color, ink density, etc.) as well as printing speed, printing costs, and maintenance requirements.

Additive manufacturing processes may be used to form structures on flat receiving surfaces as well as on contoured or non-flat surfaces. For example, some embodiments depicted in the figures may illustrate methods whereby material is printed onto a flattened surface of an article, such as a material section of an upper that has a flat or unassembled configuration. In such cases, printing material onto the surface may be accomplished by depositing material in thin layers that are also flat. Thus, a printhead or nozzle may move in one or more horizontal directions to apply an Nth layer of material and then move in the vertical direction to begin forming the N+1 layer. However, it should be understood that in other embodiments, material could be printed onto a contoured or non-flat surface. For example, material could be printed onto a three-dimensional last, where the surface of the last is not flat. In such cases, the printed layers applied to the surface may also be contoured. In order to accomplish this method of printing, a printhead or nozzle may be configured to move along a contoured surface and tilt, rotate, or otherwise move so that the printhead or nozzle is always aligned approximately normal to the surface where printed material is being applied. In some cases, a printhead could be mounted to a robotic arm, such as an articulated robotic arm with 6 degrees of freedom.

Alternatively, in still other embodiments, an object with a contoured surface could be reoriented under a nozzle so that contoured layers of printed material could be applied to the object. For example, embodiments could make use of any of the systems, features, components, and/or methods disclosed in Mozeika et al., U.S. Patent Publication Number 2013/0015596, published Jan. 17, 2013 (and filed as U.S. application Ser. No. 13/530,664 on Jun. 22, 2012), titled "Robotic fabricator," the entirety of which is herein incorporated by reference. Embodiments could also make use of any of the systems, features, components, and/or methods disclosed in Cannell et al., U.S. Pat. No. 8,123,350, issued Feb. 28, 2012, titled "Computerized apparatus and method for applying graphics to surfaces," the entirety of which is herein incorporated by reference. Thus, it may be appreciated that the present embodiments are not limited to printing processes used for printing to flat surfaces and may be used in conjunction with printing systems that can print to any kinds of surfaces having any kinds of geometry.

Generally, embodiments could apply any kind of print material to a substrate. As used herein, the term "print material," "printing material," or "printable material" refers to any material that can be printed, ejected, emitted, or otherwise deposited during an additive manufacturing process. Exemplary print materials include inks as well as resins, plastics, or other print materials associated with 2D and/or 3D printing. In some embodiments, the materials used in the printing technology could be any aqueous ink, dye-based ink, pigment-based ink, solvent-based ink, dye-sublimation ink, thermoplastics (e.g., PLA and ABS) and thermoplastic powders, acrylic resin, polyurethane, thermoplastic polyurethane, silicone, or any other curable substance. Still further examples of materials include high-density polyurethylene, eutectic metals, rubber, modeling clay, plasticine, RTV silicone, porcelain, metal clay, ceramic materials, plaster, and photopolymers, as well as possibly other materials known for use in 3D printing.

In some embodiments, a print material may be any material that is substantially moldable and/or pliable above a predetermined temperature, such as a glass-transition temperature and/or a melting temperature. In one embodiment, a print material has one or more thermal properties such as a glass-liquid transition ("glass transition") temperature and/or a melting temperature. For example, the print material may be a thermoplastic material having a glass-transition temperature and a melting temperature. As used herein, thermoplastic materials may include, for example, acrylic, nylon, polybenzimidazole, polyethylene, polypropylene, polystyrene, polyvinyl chloride, polytetrafluoroethylene (PTFE), and the like.

In some embodiments, a print material may be UV curable. Generally, any appropriate type of UV-curable print material, including acrylic resin, polyurethane, TPU, silicone, or any other appropriate print material could be used.

Some embodiments of the printing system can include provisions that permit printed structures to be printed directly onto one or more articles. The term "articles" is intended to include both articles of footwear (e.g., shoes) and articles of apparel (e.g., shirts, pants, etc.). As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used herein, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of articles of footwear, various embodiments may further be equally applied to any article of clothing, apparel, or equipment that includes three-dimensional printing. For example, various embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used herein, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, and the like.

In order to apply printed materials directly to one or more articles, printing device 102 may be capable of printing onto the surfaces of various kinds of materials. Specifically, in some cases, printing device 102 may be capable of printing onto the surfaces of various materials such as a textile, natural fabric, synthetic fabric, knit, woven material, nonwoven material, mesh, leather, synthetic leather, polymer, rubber, and foam, or any combination of them, without the need for a release layer interposed between a substrate and the bottom of the printed material, and without the need for a perfectly or near-perfectly flat substrate surface on which to print. For example, the disclosed methods may include printing a resin, acrylic, thermoplastic material, or ink material onto a fabric, for example, a knit material, where the material is adhered/bonded to the fabric and where the material does not generally delaminate when flexed, rolled, worked, or subject to additional assembly processes/steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, and foam. As used throughout this disclosure, the term "base" or "base element" may refer to any piece of fabric, textile, or other material that may comprise some or all of an article, such as a layer of fabric that is used in forming an upper.

In some embodiments, printing system 100 can include provisions that control and/or receive information from printing device 102. These provisions can include computing system 104 and network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some embodiments, a print server may be primarily responsible for controlling and/or communicating with printing device 102, while a separate computer (e.g., desktop, laptop, or tablet) may facilitate interactions with a user. Computing system 104 can also include one or more storage devices including, but not limited to, magnetic, optical, magneto-optical, and/or memory, including volatile memory and non-volatile memory.

In those instances where a computing system is used, any suitable hardware or hardware systems may be used to facilitate provisions that control and/or receive information from printing device 102. In some embodiments, where a computing system is used, computing system 104 may include central processing device 115, viewing interface 116 (e.g., a monitor or screen), input devices 117 (e.g., keyboard and mouse), and software for designing a computer-aided design representation of a printed structure. However, in other embodiments, other forms of hardware systems may be used.

In those instances where software for designing a computer-aided design representation of a printed structure is used, any suitable information may be used to facilitate provisions for designing a computer-aided design representation of a printed structure. In at least some embodiments, the computer-aided design representation of a printed layer and/or printed structure may include not only information about the geometry of the structure but also information related to the materials required to print various portions of the structure. However, in other embodiments, different information may be used.

In those instances where software for designing a computer-aided design representation of a printed structure is used, any suitable design structure may be used to transform the design into information that can be interpreted by printing device 102 (or a related print server in communication with printing device 102). In some embodiments, printing system 100 may be operated as follows to provide one or more structures that have been formed using a three-dimensional printing, or additive process. Computing system 104 may be used to design a structure. This may be accomplished using some type of CAD software, or other kind of software. The design may then be transformed into information that can be interpreted by printing device 102 (or a related print server in communication with printing device 102). In some embodiments, the design may be converted to a three-dimensional printable file, such as a stereolithography file (STL file); in other cases, the design may be converted into a different design structure. In still other embodiments, information about a structure to be printed may be sent in the form of an image file in which case image information (colors, hues, shades, transparency, etc.) of different regions can be used to determine a corresponding 3D structure. In some embodiments, for example, a design may include a greyscale image that includes pixels of varying shade levels between white and black.

In those instances where a network is used, network 106 may use any wired or wireless provisions that facilitate the exchange of information between computing system 104 and printing device 102. In some embodiments, network 106 may further include various components such as network interface controllers, repeaters, hubs, bridges, switches, routers, modems, and firewalls. In some embodiments, network 106 may be a wireless network that facilitates wireless communication between two or more systems, devices, and/or components of printing system 100. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

As discussed, a printing system may distribute various functionality across one or more devices or systems. In those instances where the printing system includes provisions that distribute one or more functions among different devices of printing system 100, any suitable protocol, format, and method may be used to facilitate communication among the devices of printing system 100. In some embodiments, these communications are conducted using network 106; in other cases, these communications may be conducted directly between devices of printing system 100.

Printing device 102 may include a receiving surface, or printing surface, where an article, or more generally a base, or base element (textile, etc.), can be placed for printing. In FIG. 1, printing device 102 includes a table-like structure with printing surface 103 where a base, such as a part of an article, can be placed for printing. Additionally, printing device 102 may include print head assembly 400 that further includes at least one reservoir of a structural print material that can be printed onto a base.

Figure 2:
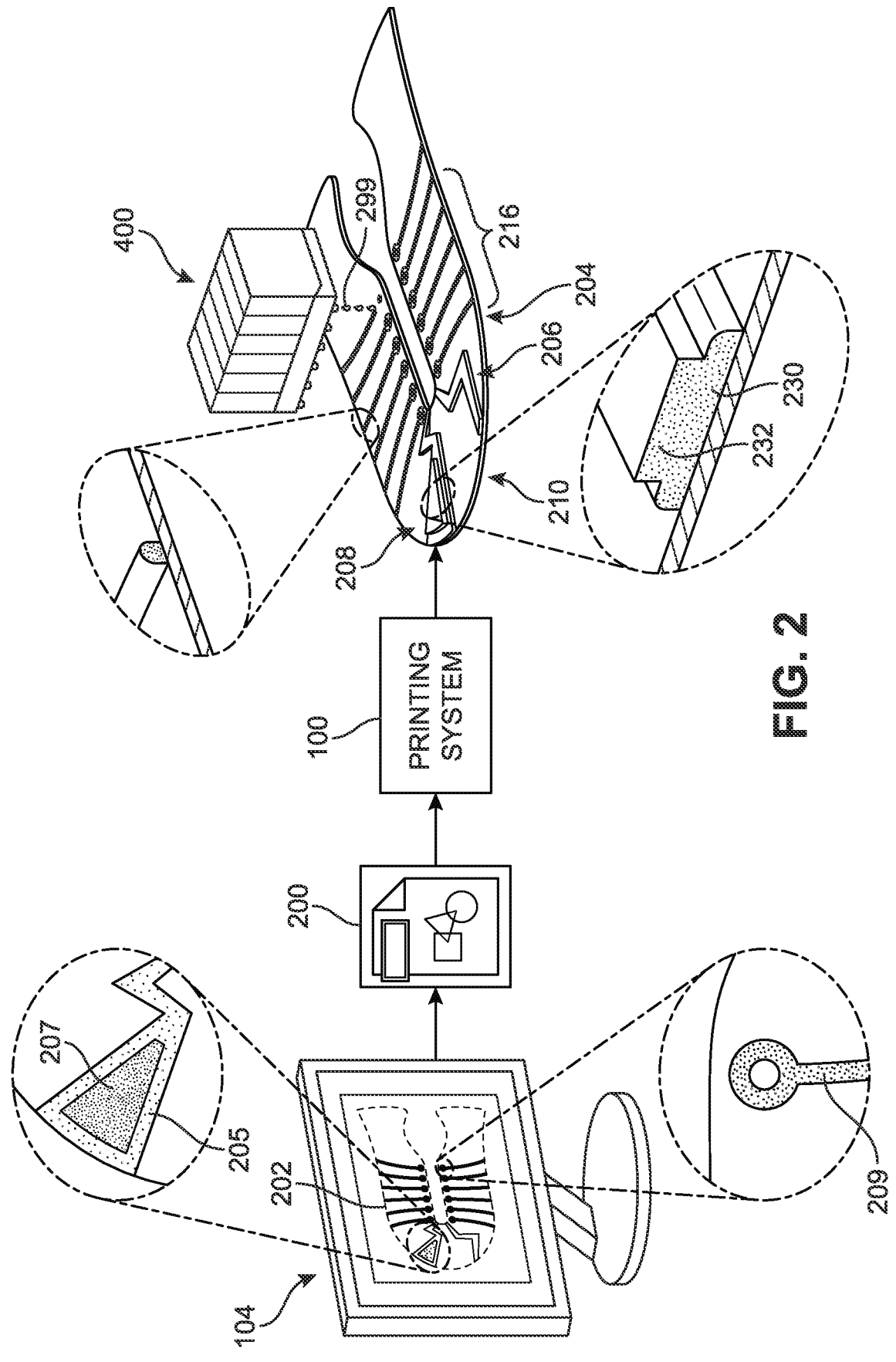
FIG. 2 is a schematic view of an embodiment of inputs and outputs to a printing system.

FIG. 2 is a schematic overview of inputs and outputs to printing system 100, according to an embodiment. Referring to FIG. 2, image file 200 may be sent to printing system 100. In some cases, image file 200 may be stored on the same computing system that is part of printing system 100 (e.g., computing system 104). In other embodiments, image file 200 could be stored on a different system or device from printing system 100. Moreover, image file 200 could be generated by any computer system or device (e.g., a digital camera) and/or processed with any processing software (e.g., Adobe Photoshop) or hardware.

As used herein, an image file may be any kind of file that includes information corresponding to one or more images. Generally, any kind of image file format could be used, including, but not limited to, JPG, PNG, GIF, TIF, RAW, as well as various other kinds of image file formats including formats specific to 2D or 3D printing (e.g., STL). Moreover, it may be understood that an image file could include header information or any other additional information beyond information that directly corresponds to an image.

In the embodiment of FIG. 2, image file 200 comprises information related to a single image 202, which is depicted schematically on the screen of computing system 104. Here, image 202 is intended to be representative of a greyscale image, which uses only black, white, and grey shading. In

Figure 8:
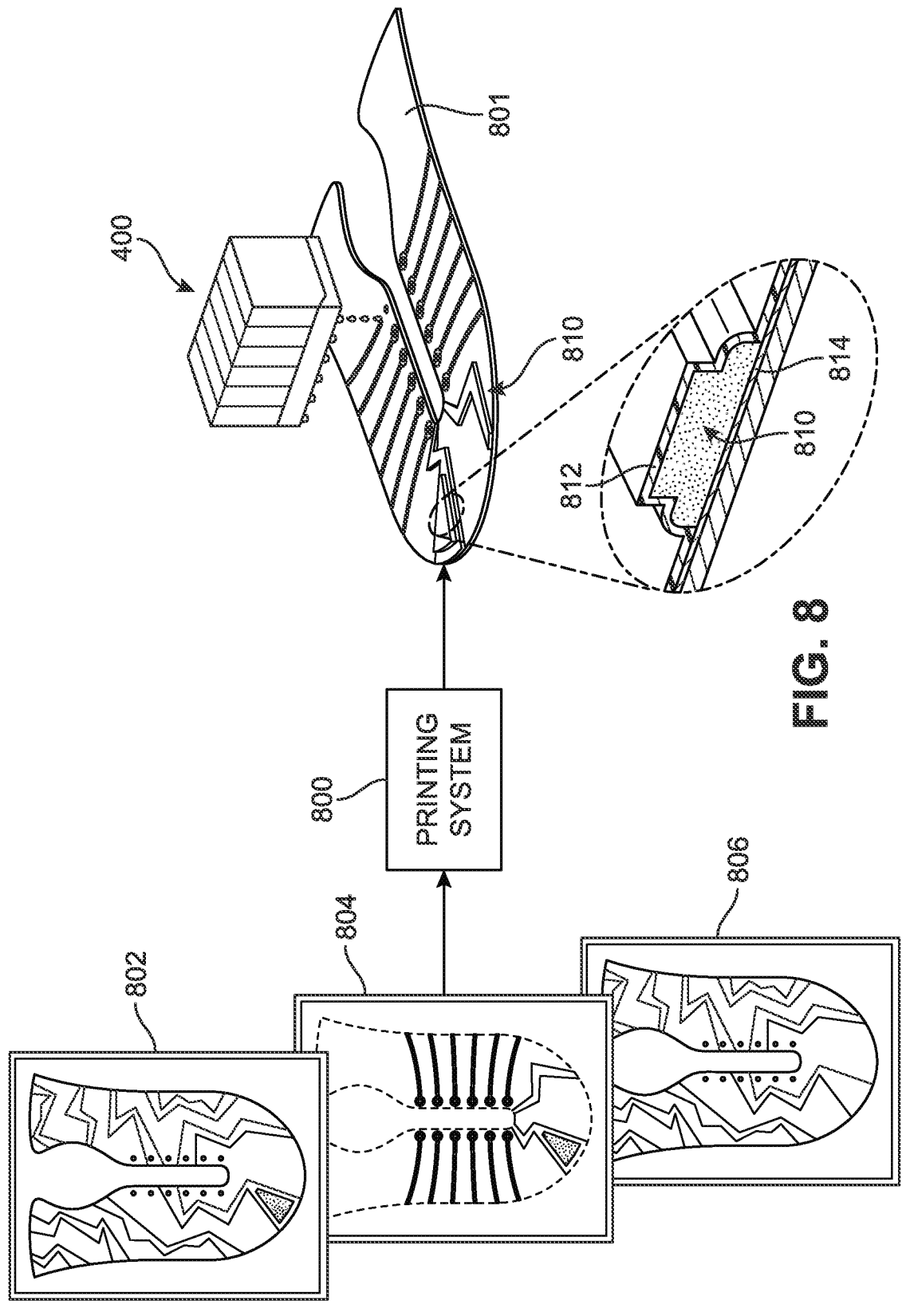
FIG. 8 is a schematic view of another embodiment of a printing system including various input images.
Figure 9:
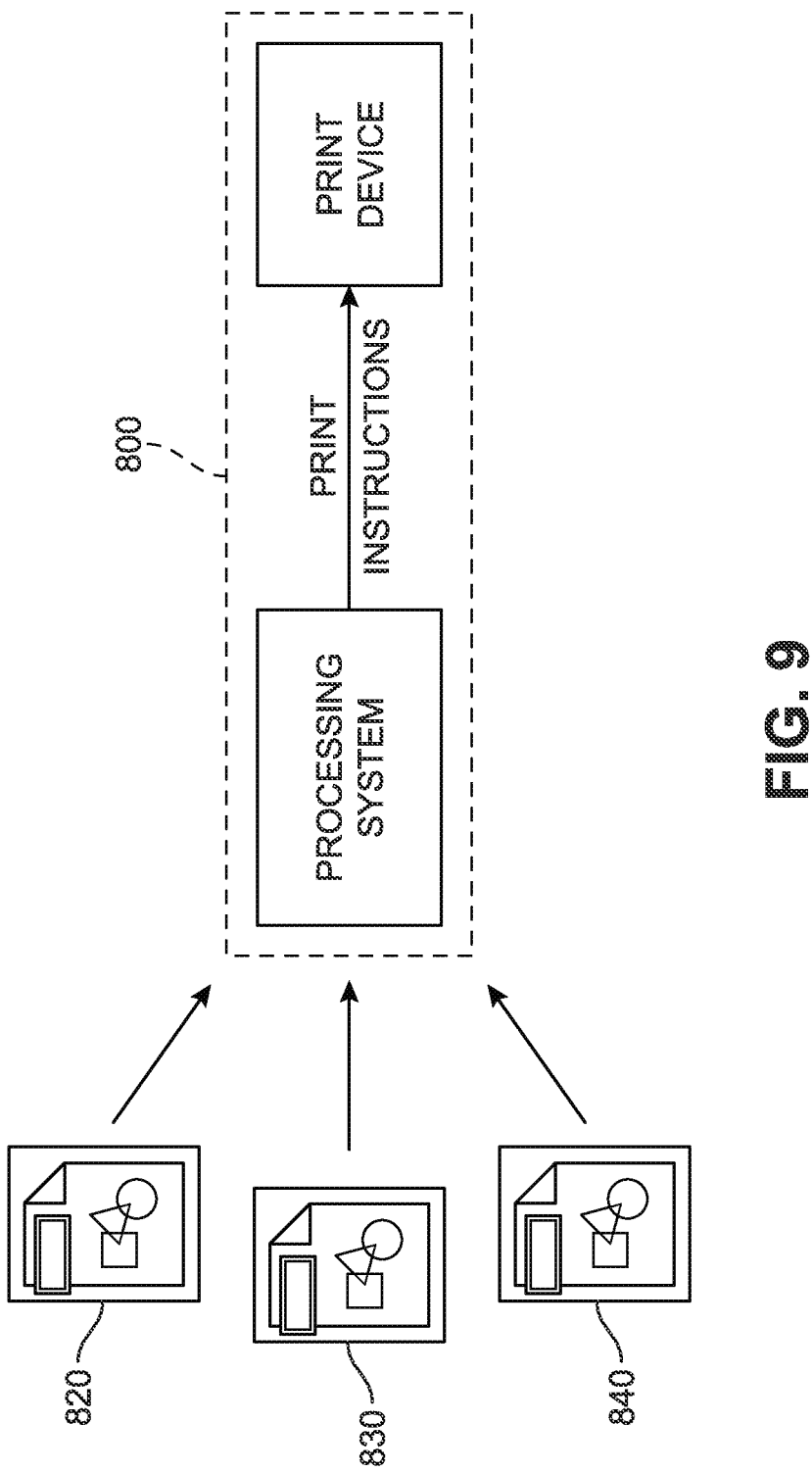
FIG. 9 is a schematic view of an embodiment of some components of a printing system.
Figure 10:
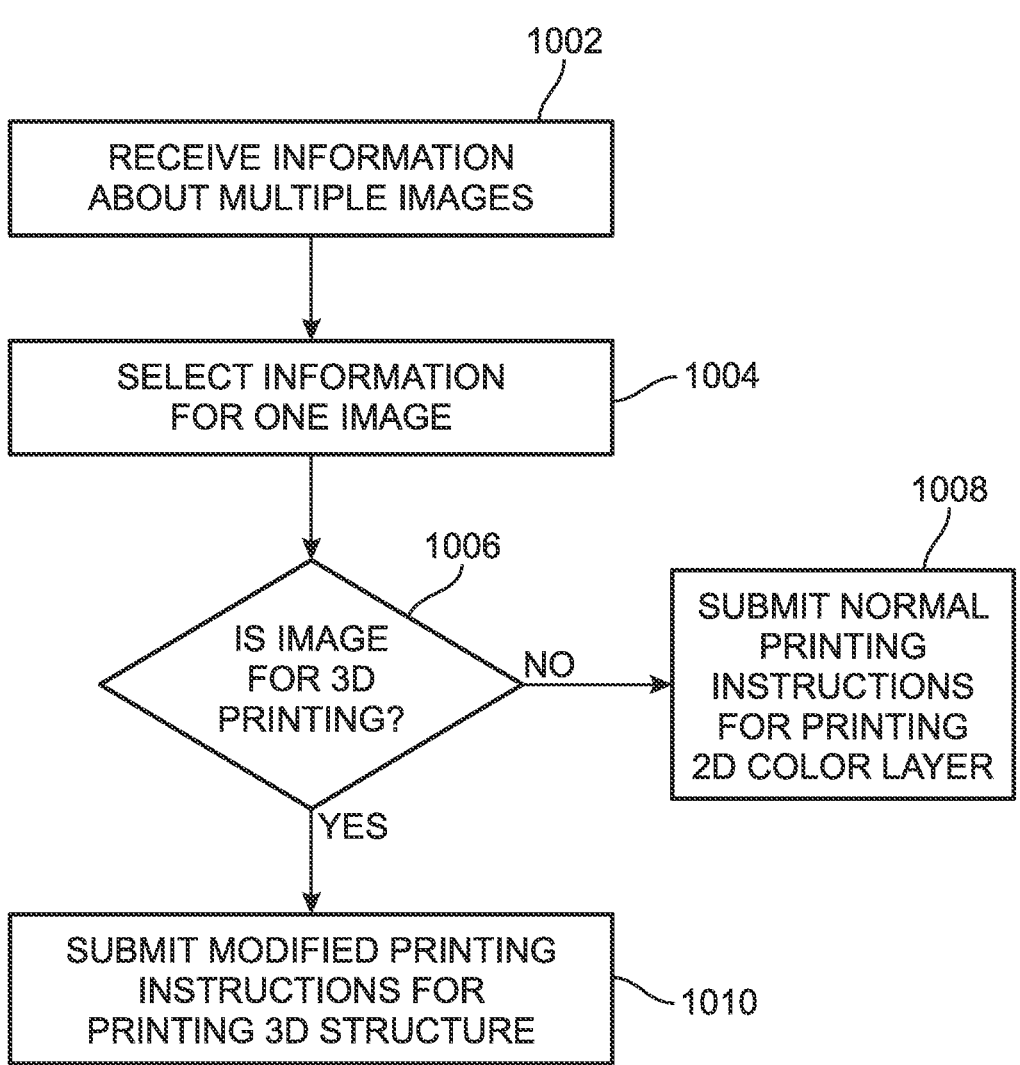
FIG. 10 is a schematic view of a process of controlling a printing device.

8 contrast, other embodiments could include one or more color images, as discussed in further detail in the embodiment shown in FIGS. 8-10.

Using information from image file 200, printing system 100 may produce upper 204 with printed components 206. Specifically, printing device 102 prints structural print material 299 (using print head assembly 400) onto upper 204 to form printed components 206. In the exemplary embodiment, printed components 206 include eyelet elements 216 as well as geometric printed feature 208 in toe region 210 of upper 204. Here, eyelet elements 216 are represented in image 202 with pixels 209 having a dark grey (i.e., 70% black) shade level. In contrast, geometric printed feature 208 includes regions of varying heights corresponding to different pixel colors in image 202. For example, thinner region 230 of geometric printed feature 208 corresponds with a section of pixels 205 in image 202 having a light grey shade level. Likewise, thicker region 232 of geometric printed feature 208 corresponds with a section of pixels 207 in image 202 having a darker grey shade level. In some cases, using smoothly varying shade levels in a greyscale image allows for the creation of generally smooth 3D contours in the resulting printed structure.

Thus, the embodiments include provisions for printing 3D structures onto an article using information from 2D images. This is accomplished, in part, by instructing a printing device to deposit more print material in regions where a 2D image is darker and instructing a printing device to deposit less print material in regions where a 2D image is lighter. Moreover, as discussed in further detail below, the printing device is instructed to print from a reservoir containing a structural print material, rather than an ink or other conventional print material for forming 2D layers or images. Such a method may be used to produce 3D printed structures (or components) without requiring a 3D print file, such as a stereolithography (STL) formatted file.

Figure 3:
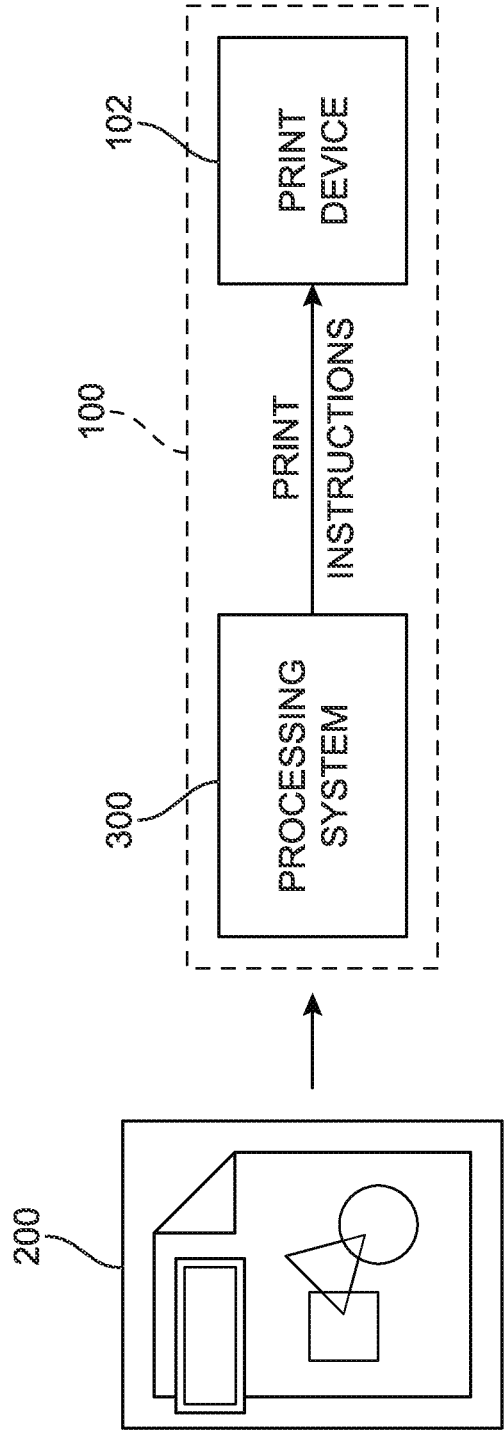
FIG. 3 is a schematic view of an embodiment of some subcomponents of a printing system.

FIG. 3 is a schematic view of some of the components and systems of printing system 100. Initially, information from image file 200 may be sent to processing system 300, which may also be referred to as a printing control system. Processing system 300 may provide a set of printing instructions to printing device 102. Specifically, processing system may include any systems, components, methods, or processes related to generating printing instructions for producing 3D structures from 2D image information and/or from 3D printing files. In some embodiments, processing system 300 converts image information in image file 200 into information about which colors should be printed at each print location, or pixel, along the print surface (e.g., the surface of an upper or other article). Thus, for example, processing system 300 may convert RGB (and possible hue, saturation, and brightness) values for each pixel of the image into specific ink colors (including combinations of ink colors) to be printed at a location corresponding to that pixel. In some cases, processing system 300 could further determine a shade level (e.g., 40% black) or quantity of each ink to be printed. For example, to print absolute black on a particular location of a substrate, processing system 300 may send information that instructs printing device 102 to print a maximum amount of ink (which is preset) at the given location, while to print grey on another location of the substrate, processing system 300 may send information that instructs printing device 102 to print 50% of the maximum amount of ink at the other location. When non-structural print materials such as inks are used, the use of additional ink at a given location may create a fuller or richer color. However, when structural print materials are used, additional material may result in the buildup of 3D structures on the surface of the substrate. As discussed in more detail below, processing system 300 may send information to printing device 102 that specifies which cartridge, reservoir, or nozzle that print material for a particular "color" should be printed from.

Figure 4:
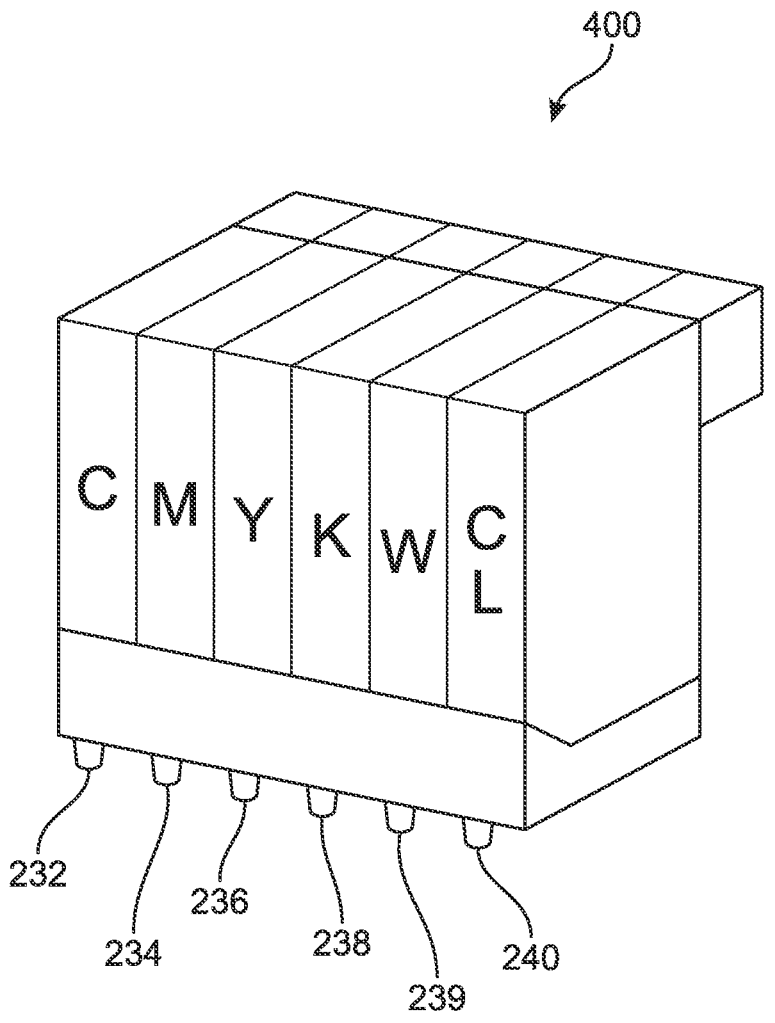
FIG. 4 is a schematic view of an embodiment of a printhead for a printing system.

FIG. 4 illustrates a schematic view of an enlarged portion of a print head assembly 400 of printing device 102. In some embodiments, print head assembly 400 may be further mounted to an actuating system of some kind. In some cases, an actuating system (not shown) may include various provisions for facilitating the movement of print head assembly 400 and/or other components or devices. It may be understood that any known systems, devices, or methods for moving printheads to various positions within a printer or similar device could be used. Such provisions may include various kinds of electric motors, or other drive devices known in the art for use in printers.

Some embodiments of the printing device can include provisions that permit color printing. In some embodiments, the printing system may use CMYK printing. In other embodiments, the color printing may be conducted using another suitable printing method.

In those instances where CMYK printing is used, any suitable device, protocol, standard, and method may be used to facilitate the color printing. As used herein, "CMYK" may refer to four pigments used in color printing: "C" for a cyan pigment, "M" for a magenta pigment, "Y" for a yellow pigment, and "K" for a black pigment. An example of a printing device using CMYK printing is disclosed in Miller, U.S. Patent Publication Number 2015-0002567, published on Jan. 1, 2015, titled "Additive Color Printing" (U.S. patent application Ser. No. 13/927,551, filed on Jun. 26, 2013), which application is herein incorporated by reference and referred to hereafter as the "Color Printing" application. In some embodiments, the printing system 100 can include one or more features of the systems, components, devices, and methods disclosed in the Color Printing application to facilitate color printing. For example, printing device 102 may be configured to print an image by dispensing droplets of a print material including one or more pigments onto a base. As used herein, droplets may refer to any suitable volume of print material. For example, a droplet may be 1 milliliter of print material. In other embodiments, printing system 100 may use other systems, components, devices, and methods.

In those instances where CMYK printing is used, CMYK may produce or approximate any color in the visible spectrum by printing and intermixing various combinations of pigments. Referring to FIG. 4, print head assembly 400 includes separate ink cartridges for cyan (C), magenta (M) and yellow (Y). Thus, the printhead assembly can dispense inks or other colored print materials for the colors cyan (dispensed by nozzle 232), magenta (dispensed by nozzle 234), and yellow (dispensed by nozzle 236). Combinations of the dispensed colored materials may be intermixed to produce one or more colors of red, green, and blue. Further intermixing of colored print materials may be used to produce many more colors beyond red, green, blue, cyan, magenta, and yellow. In the exemplary embodiment, print head assembly 400 may further include a separate cartridge for dispensing black ink or black print material (K), which may be dispensed by nozzle 238. In some embodiments, printing device 102 may include a white cartridge for dispensing white print material (W), which may be dispensed by nozzle 239. While one cartridge for each print material is depicted in FIG. 4, consistent with some embodiments, printing device 102 may include more than one cartridge for one or more of the print materials of print head assembly 400. For purposes of convenience, the terms "nozzle," "reservoir," and "cartridge" may be used interchangeably in the specification and claims to refer to the source of a particular type of print material (including inks and structural print materials). It may be appreciated, however, that in some cases multiple nozzles could dispense ink from a common reservoir or cartridge of print material.

In those instances where CMYK printing is used, any suitable print material may be used to facilitate color printing. In some embodiments, CMYK print materials may be water based. In other embodiments, CMYK print materials may be oil based. In some embodiments, CMYK print material may include a structural print material.

Some embodiments may also use a structural print material, whose purpose is to provide 3D structure rather than color. In some embodiments, CMYK print materials may include a clear and/or transparent structure print material. In some embodiments, a CMYK print material may include an opaque structure print material. In some embodiments, the CMYK print material may include a translucent structure print material. In other embodiments, the structural material may have a combination of transparent structural material and/or translucent structural material.

Referring to FIG. 4, print head assembly 400 includes at least one cartridge that dispenses a clear structural print material (CL), which is dispensed by nozzle 240. Although the exemplary embodiments may use clear structural print materials, other embodiments could include structural print materials with pigments.

Although not shown in the figures, embodiments that incorporate structural print materials can include curing devices to help cure the print materials. Embodiments may include provisions for curing one or more kinds of print materials. Generally, any known methods and/or devices for curing printable substances could be used. Some embodiments may use ultraviolet (UV) curing lamps. Embodiments using a UV lamp can utilize any type of UV lamp. Exemplary lamps that could be used with the embodiments include, but are not limited to, mercury vapor lamps (including H type, D type, or V type mercury lamps), fluorescent lamps, and/or UV LED devices. The type of lamp used may vary according to the type of print material, the type of printing application, the type of printing device used, as well as other manufacturing considerations including cost and availability. Other embodiments could use other forms of curing, such as electron-beam curing. Still other embodiments could omit curing devices.

As previously discussed, it is contemplated that a printing system could print a 2D image to form a 3D structure by instructing a printing device to print various shade levels of a print material from a designated cartridge having a structural print material. In some cases, printing similar quantities of a structural print material rather than a conventional ink may result in regions of different thickness or height in a 3D printed component.

Figure 5:
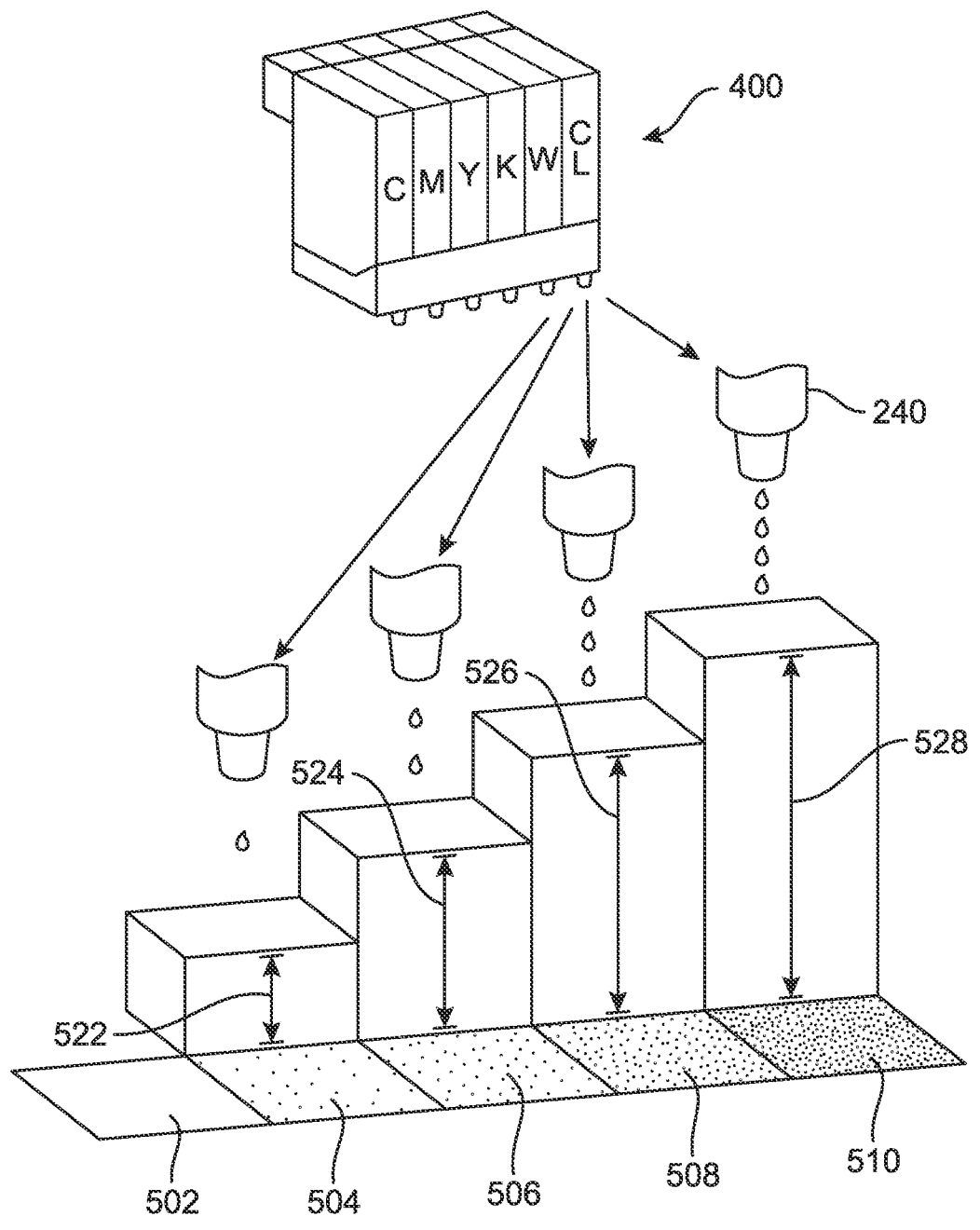
FIG. 5 is a schematic view of a relationship between a shade level of a pixel in a greyscale image and the height for a corresponding printed region.

FIG. 5 is a schematic view of the relationship between the shade level of a region of an image (e.g., a pixel) and the corresponding amount of structural print material that would be deposited in the corresponding region on a base. In a greyscale image, each pixel may take on any colors or shades between "solid white" and "solid black", which are hereby referred to as "shade levels." In situations where a colored ink (e.g., black) is used to print a greyscale image, the printing system may instruct the printer to deliver different volumes of ink at locations corresponding to pixels having different shade levels. For example, printing a grey-scale image with black ink may include printing a maximum predetermined volume or quantity of ink for solid black pixels, printing no ink for solid white pixels and printing some range of volume between zero volume and the maximum predetermined volume for pixels of intermediate shade levels.

As seen in FIG. 5, in some embodiments the printing instructions for printing different shade levels could be used to print structural layers of different heights, since each shade level corresponds with a different volume of print material. For example, locations on a print surface corresponding to regions or pixels of an image with solid white shade level 502 would not receive any print material. In contrast, locations on a print surface corresponding to regions or pixels of an image with solid black shade level 510 would receive a maximum predetermined volume of print material. At these locations, the structural print material may be formed into a portion with height 528. Further, locations on a print surface corresponding to regions or pixels of an image having intermediate shade levels between solid white and solid black would receive a corresponding percentage of the maximum predetermined volume of print material. For example, light grey shade level 504 that is slightly darker than solid white shade level 502 might receive 25% of the total volume of a structural print material, resulting in a structure with height 522, which may be 25% of height 528. Similarly, medium grey shade level 506 might receive 50% of the total volume of a structural print material, resulting in a structure with height 524, which may be 50% of height 528. Further, dark grey shade level 508 might receive 75% of the total volume of a structural print material, resulting in a structure with height 526, which may be 75% of height 528. Therefore, it may be seen that a 3D structural object can be formed by using shade level information to print varying volumes of print material on a print surface. In some cases, the relationship between the height of a printed region and a shade level may be linear. For example, in some cases as the shade level is doubled (e.g., from 20% black to 40% black) the height is doubled (e.g., from two printed layers to four printed layers).

It may be appreciated that the structures shown in FIG. 5 could be formed with a single pass of a printhead in which the volume of print material is varied at each location. Alternatively, in other embodiments, these structures could be successively built up by printing a single layer of fixed height for each pass of the printhead, and applying more layers to taller regions. It may be further appreciated that both methods may be accomplished by providing different shade levels to a printing device, as the device may be configured to print different shade levels with standard inks using a single pass or by successively applying more ink to certain pixels with multiple passes.

Figure 6:
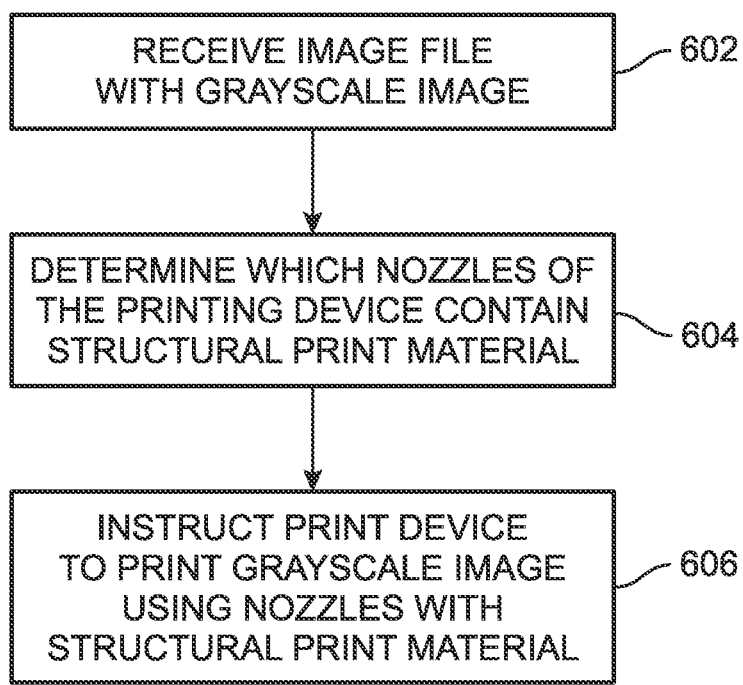
FIG. 6 is an embodiment of a process for a printing system.

FIG. 6 is an embodiment of a schematic method of operation of a printing system. It may be appreciated that some of the following steps could be optional in some embodiments. Other embodiments could include additional steps not shown in FIG. 6. Moreover, in some embodiments, the various steps described here could be accomplished by a printing system, including a subsystem of a printing system (such as a processing system or a printing device). In other embodiments, one or more steps could be accomplished by any other system peripheral to the printing system.

Figure 7:
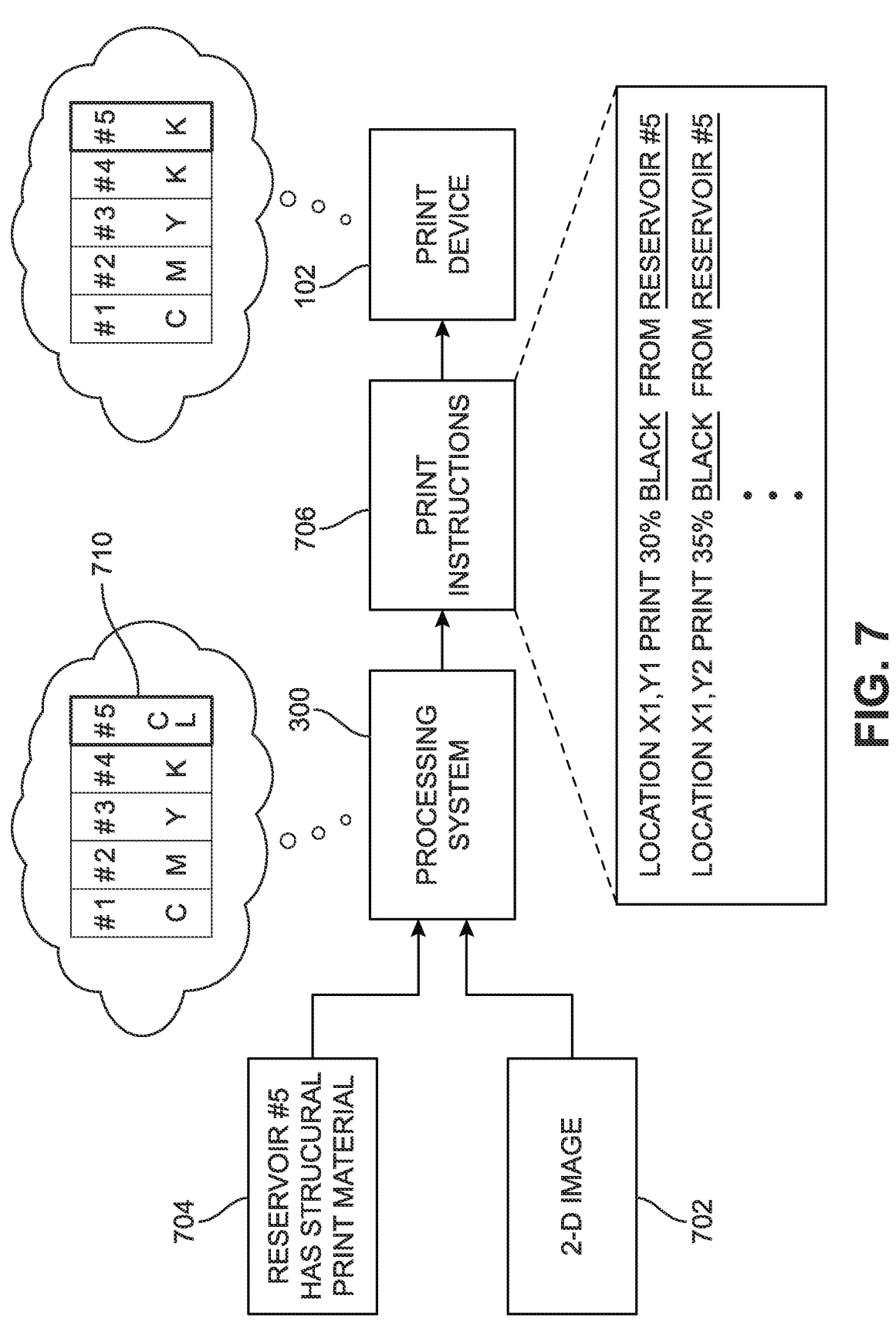
FIG. 7 is a schematic view of an embodiment of a printing system that shows a possible set of printing instructions delivered to a printing device from a processing system.

For purposes of understanding the following process, an exemplary configuration of a printing system utilizing this process is shown in FIG. 7 and discussed in reference to the process of FIG. 6.

In step 602, a printing system may receive an image file with information corresponding to a greyscale image. For example, in some cases a user may import an image file from a file location on a computing system associated with the printing system. In some cases, the image file may be created and/or modified using graphical software, such as image editing software. In some cases, this software may be considered part of the printing system, while in other cases this software could be considered as external to the system. FIG. 7 depicts exemplary 2D image 702 that is received at processing system 300.

Next, in step 604, the printing system may retrieve information about the nozzles and corresponding print materials for each nozzle associated with one or more printheads of the printing device. Specifically, in some cases, the printing system may determine which print nozzles have color inks, including which nozzles have black ink, as well as which nozzles may have structural print materials. In some cases, this information can be stored in a database of the printing system prior to printing. In other cases, the printing system could prompt a user to provide this information. In some cases, the information may be provided as identification information for one or more reservoirs of print materials (for one or more nozzles or cartridges). Thus, for example, in an embodiment where different reservoirs are identified using some ID number, the printing system may determine the ID numbers corresponding to reservoirs with structural print material.

It may be appreciated that in some cases a printing device may not have information about the type of print material in each print cartridge. In printers that are modified to print structural print material, for example, the structural print material may be disposed in a reservoir that is usually intended to hold a colored ink. Therefore, the printing instructions submitted to the printing device by, for example, a processing system, may include ID information about each nozzle with explicit instructions about which nozzle to use for printing. Thus, when the system prints a 2D greyscale image as a flat 2D layer, the printing device may be instructed to print from a nozzle that contains black ink, and when the system prints 3D structure, the printing device may be instructed to print from a nozzle that contains a structural print material. In either case, the printing device provides a given volume of print material according to the target shade level.

As an example of step 604, the embodiment shown in FIG. 7 includes reservoir information 704 that is also received at processing system 300. Specifically, reservoir information 704 indicates that reservoir #5 of a printhead assembly 710 in printing device 102 includes a clear structural print material. Thus, for purposes of illustration, processing system 300 is seen to have knowledge of the print material in each of the reservoirs of an exemplary print head (represented in FIG. 7 in internal processes).

During step 606, the printing system provides instructions to the printing device to print the image file information using a set of nozzles with structural print material. In some cases, during step 606, the printing system provides instructions including the ID of a reservoir to print from, as well as a color and/or shade level, such as 50% black. As indicated in FIG. 7, print device 102 operates as though reservoir #5 includes a black ink, which may include calculating an amount of print material to deposit at each location based on a greyscale shade level.

In FIG. 7, exemplary set of print instructions 706 are illustrated. In this example, exemplary set of print instructions 706 include instructions for printing a particular shade level at given locations (e.g., "x1, y1", "x1, y2", etc.). In some cases, the shade level may be given as a percent of an absolute color (e.g., "30% black," "35% black," etc.). Additionally, exemplary set of print instructions 706 may specify the location of the reservoir that contains the instructed ink color. In this case, when the printing device prints from the instructed reservoir, a structural print material is deposited rather than a black ink, which forms a resulting 3D structure.

This configuration may allow a printing device to print 3D structures without requiring the printing device to have provisions for using 3D print files or 3D print drivers. Instead, 3D printing is accomplished by providing the printing device with instructions expected for printed 2D images, but using a structural print material that allows for the creation of 3D contours.

Some embodiments may include provisions that allow a printing system to know when a greyscale image should be printed as a 2D greyscale design vs. using the image information to print a 3D structure. In some cases, the printing system may determine if the image file information is intended to be used for 3D printing prior to instructing a printing device. In other words, the printing system (i.e., processing system 300 of FIG. 3) determines if the image file information should be used for printing a 3D structure. In different embodiments, the system may make this determination in a number of different ways. In some cases, a user of the system provides an explicit instruction to the system, such as through a GUI or command line interface with the printing system, which informs the system that the image file information should be used in printing a 3D structure. In other cases, a printing system can have capabilities for automatically determining that a given file is intended to be used for printing a 3D structure. In some cases, for example, the image file could include header information or other metadata that indicates its intention for use in 3D printing.

FIG. 8-9 illustrate schematic views of another embodiment for printing system 800. The embodiment of FIGS. 8-9 may share many features of the previous embodiments, and may also include some new features as well as leave out other features. For example, in FIGS. 8-9, printing system 800 is configured to receive information for three different images. These include first color image 802, greyscale image 804, and second color image 806. Similarly to the previous embodiment, greyscale image 804 comprises information that can be used by printing system 800 to form three-dimensional structures 810. In addition, first color image 802 and second color image 806 can be applied to top surface 812 and bottom surface 814, respectively, of components 810. Moreover, second color image 806 could be an inner color layer that is disposed between components 810 and underlying base 801 (i.e., an upper in this embodiment).

The image information passed to the printing system could take on various forms in different embodiments. For example, in some embodiments, each image could be sent as a separate file to the printing system (e.g., each image could be a separate jpeg, png, tiff, or other kind of graphics file). In FIG. 9, for example, each image is sent as a separate file (i.e., image file 820, image file 830, and image file 840). In other embodiments, multiple images could be sent as part of a single file. Still other embodiments may include provisions for sending image information with additional information, such as various parameters, that could be provided as part of a header (e.g., as part of the header in a tiff file, which supports header information).

It may also be appreciated that other embodiments could use only a top color image or a bottom color image. In some embodiments, for example, only a bottom color image could be used and the resulting printed article would include a bottom color layer with an overlaid 3D structure. In other embodiments, only a top color image could be used and the resulting printed article would include a 3D structure printed directly to the article (without an intermediate color layer) and would also include a top color layer printed onto the structure.

FIG. 10 is an embodiment of a schematic method of operation of a printing system. It may be appreciated that some of the following steps could be optional in some embodiments. Other embodiments could include additional steps not shown in FIG. 10. Moreover, in some embodiments, the various steps described here could be accomplished by a printing system, including a subsystem of a printing system (such as a processing system or a printing device). In other embodiments, one or more steps could be accomplished by any other system peripheral to the printing system.

In step 1002, a printing system may receive image file information. For example, in some cases, a user may import an image file from a file location on a computing system associated with the printing system. In some cases, the image file may be created and/or modified using graphical software, such as image editing software. In some cases, this software may be considered part of the printing system, while in other cases this software could be considered as external to the system.

In the present embodiment, information about multiple images could be received. For example, information about a greyscale image as well as information about one, two, or more color images could also be received. In some cases, the different images could be received as separate files. In other cases, the images could be represented by data in a single file.

In step 1004, the printing system selects information about one of the images. In cases where a single file may be received, the printing system extracts the information corresponding to one of the images in the file. In other cases, the printing system selects a file corresponding to an image among multiple files.

In step 1006, the printing system determines if the image is for 3D printing. This may be determined in various ways, including by checking a parameter or other metadata received with the image information that indicates the image is for 2D or 3D printing. In other cases, the printing system could automatically determine if the image is to be used for 3D printing according to the image information itself. For example, in some cases a printing system is configured so that any pure greyscale file is always assumed to be for 3D printing.

If the image is not for 3D printing, the printing system proceeds to step 1008. The printing system will send normal printing instructions for printing 2D color layers (or 2D black/white layers).

However, if the system determines during step 1006 that the image is intended to be used for 3D printing, the printing system proceeds to step 1010. The printing system may then generate and submit modified printing instructions for printing a 3D structure using the image information. In some embodiments, the printing system could follow steps similar to step 602, step 604, and step 606 of FIG. 6 in generating and submitting the instructions to print a 3D structure using the image information.

As used throughout this detailed description and in the claims, the terms "normal printing instructions" may generally refer to instructions generated and sent to a printing device when a 2D layer is printed. In contrast, "modified print instructions" are generated and sent to a printing device for printing a 3D object or layer. The distinction between these two types of instructions can vary in different embodiments. In one embodiment, modified print instructions include instructions to print from a reservoir having a structural print material (clear or opaque), whereas normal print instructions include instructions to print from a reservoir having a "conventional print material" for 2D printing, such as an ink or dye that cannot be used for forming 3D contoured structures or objects.

Figure 11:
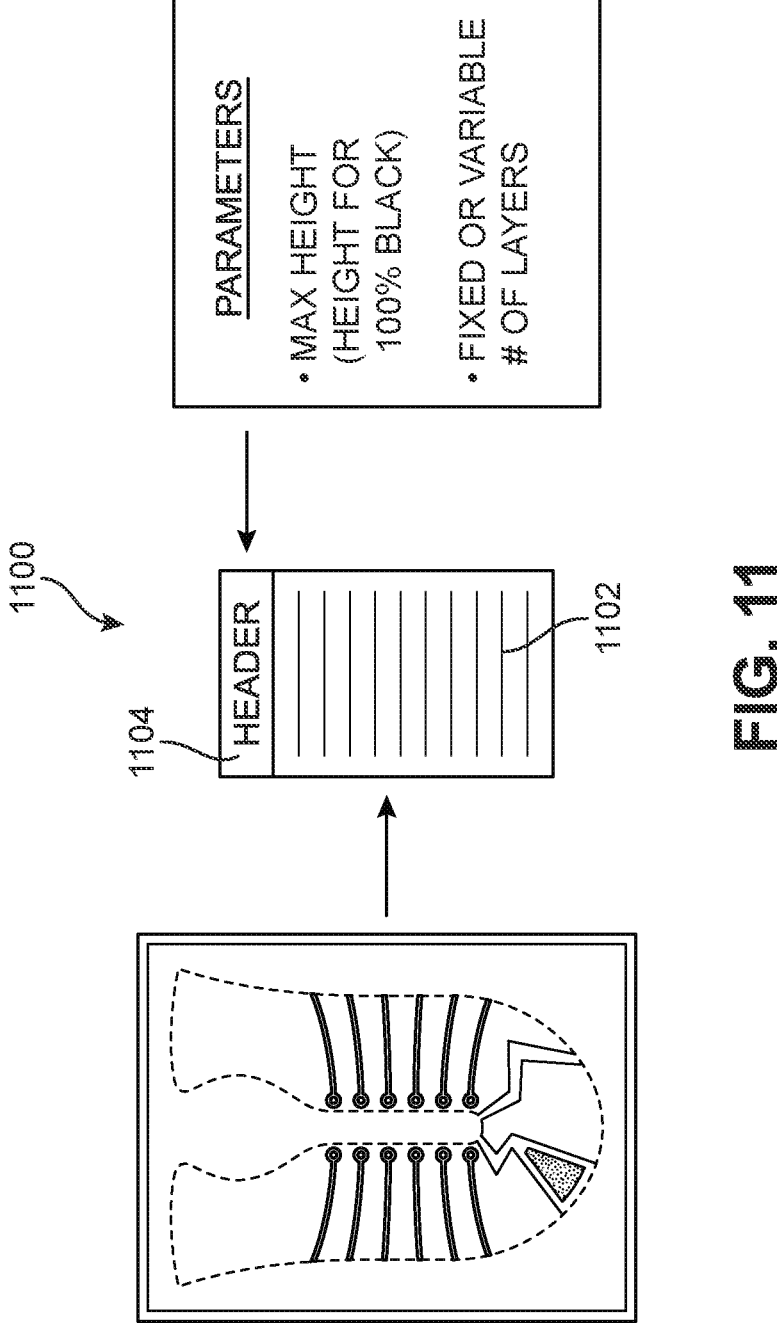
FIG. 11 is a schematic view of an embodiment of file information that could be provided to a printing system.

FIG. 11 is a schematic view of an embodiment of file 1100 for use with a printing system. In some embodiments, file 1100 may include image information as well as other parameters and/or metadata. As seen in FIG. 11, file 1100 may include image portion 1102 that contains image information or image data. Additionally, file 1100 could include header portion 1104 that contains information about image data, such as the maximum height of a 3D structure. In some cases, header portion 1104 could also indicate whether the structure should be printed with a fixed or variable number of layers. The header information can be used to determine how many layers to print at each point or location (in situations where a variable number of layers are printed) or how thick to print the layers at each point or location (in situations where a fixed number of layers are printed).

Figure 12:
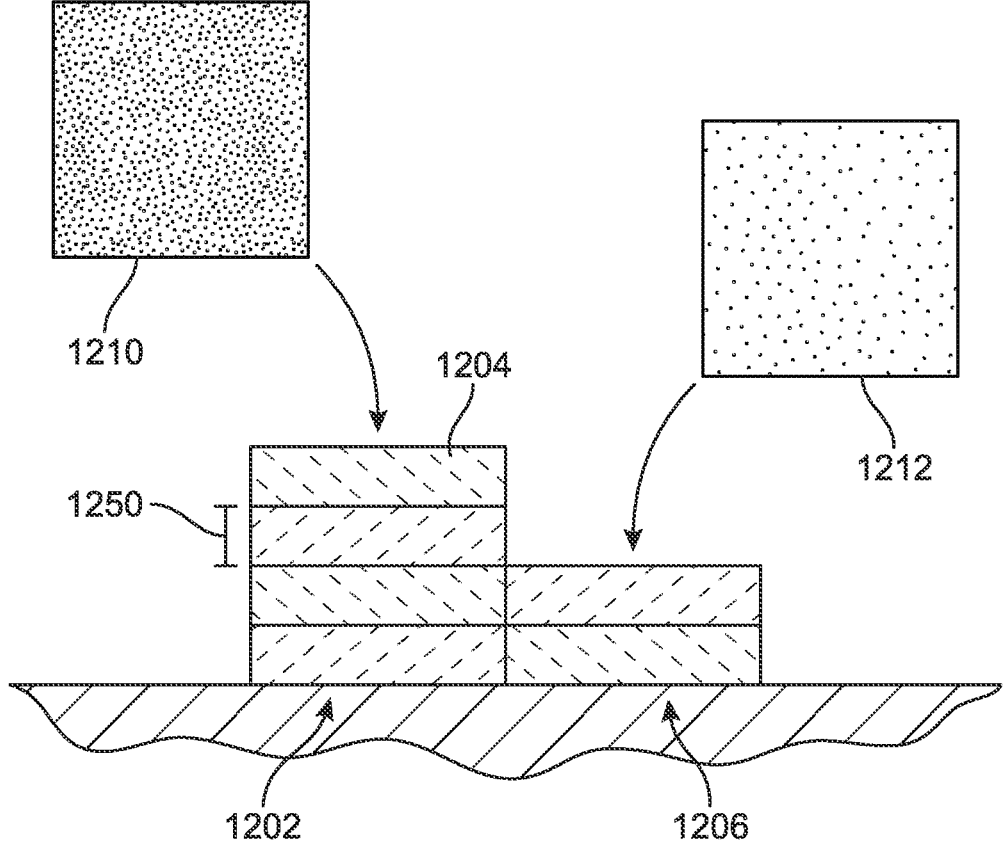
FIG. 12 is a schematic view of a method of printing regions of different heights, according to an embodiment.
Figure 13:
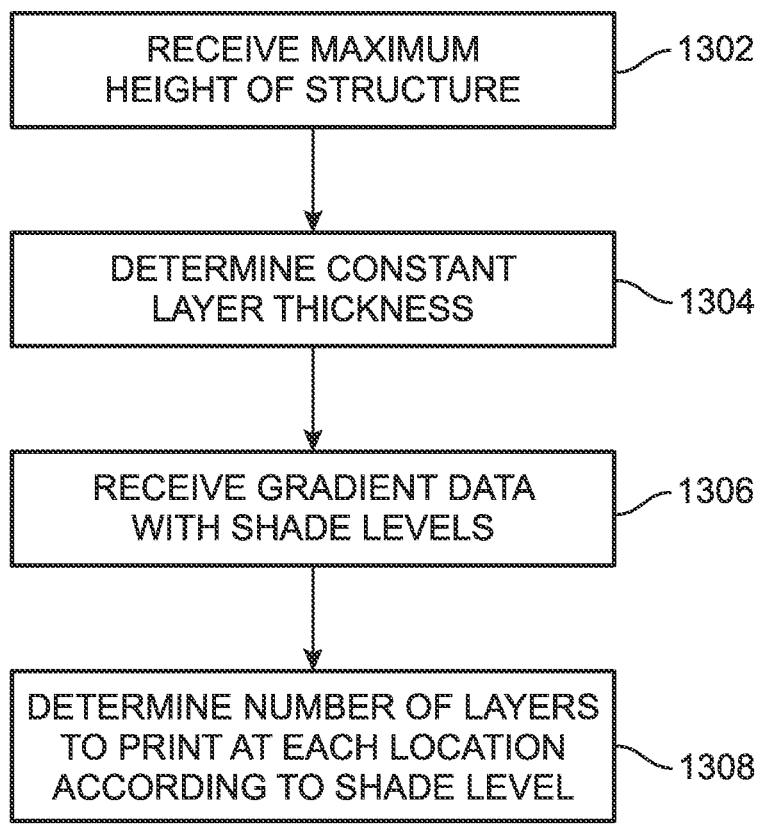
FIG. 13 is an embodiment of a process of printing regions of different heights, according to an embodiment.

FIGS. 12-13 illustrate schematic views for an embodiment where a printing system prints a variable number of layers of a structural print material in order to achieve a particular thickness at a given location of a structure. Specifically, FIG. 12 illustrates a schematic view of two printing locations for a 3D structure. At first location 1202, four printed layers 1204 of fixed height 1250 are printed as determined by shade level 1210 at a corresponding pixel in a greyscale file. At second location 1206, only two printed layers 1204 of fixed height 1250 are printed as determined by shade level 1212 at a corresponding pixel in the same greyscale file. Thus, it may be clearly seen that in some cases a printing system prints portions with varying heights by stacking up different numbers of constant thickness layers, according to the shade level representing that location within a greyscale file.

FIG. 13 illustrates an embodiment of a process for printing using a variable number of layers to form three-dimensional structures. In step 1302, the printing system receives the maximum height of a structure. This value may be input manually by an operator of the system or could be provided as data along with image information for the greyscale image. The maximum height may be the printed height for any region where a corresponding pixel of the greyscale image is 100% black (or the maximum shade level). Next, in step 1304, the printing system may determine, or otherwise receive, the constant layer thickness. This may be the thickness of each layer to be printed. In some cases, this value could be calculated or otherwise determined according to the maximum height and using other parameters to constrain the thickness. In other cases, the constant layer thickness is given as an input to the printing system.

Next, in step 1306, the printing system may receive gradient data with different shade levels. In some cases, the gradient data is greyscale information. However, it may be appreciated that in other embodiments gradient data could be provided as different shades of a non-grey color, such as shades of blue or shades of red. Such gradient data could be treated in a similar manner to greyscale data for the purposes of forming a 3D printed structure.

Finally, in step 1308, the printing system may determine the number of layers to print at each location according to the shade level. Thus, regions with 100% black shade levels may be printed to have the maximum thickness or height of the 3D structure, while regions with less than 100% black shade levels will have less thickness or height when printed. Moreover, using this configuration, the regions of maximum thickness will have a greater number of layers than the regions with thicknesses less than the maximum thickness.

Figure 14:
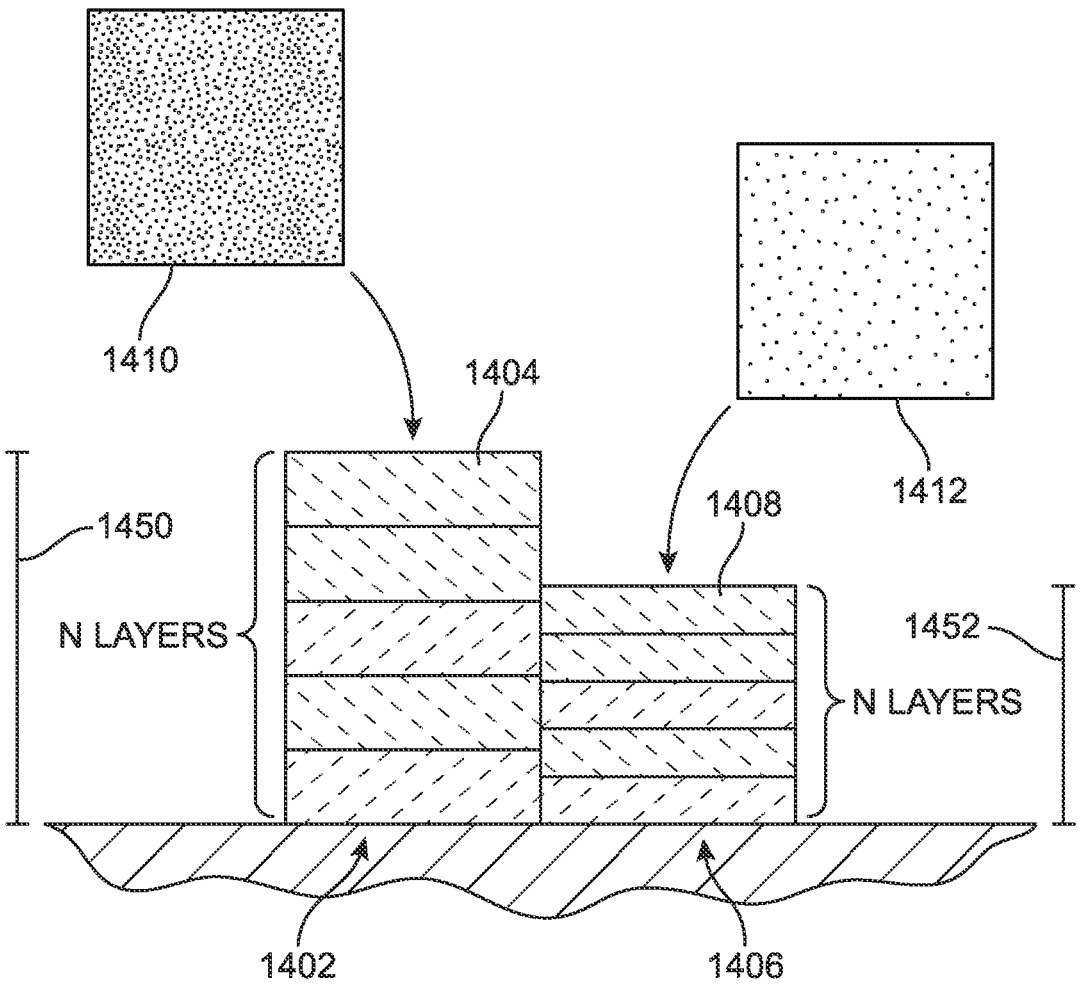
FIG. 14 is a schematic view of another method of printing regions of different heights, according to an embodiment.
Figure 15:
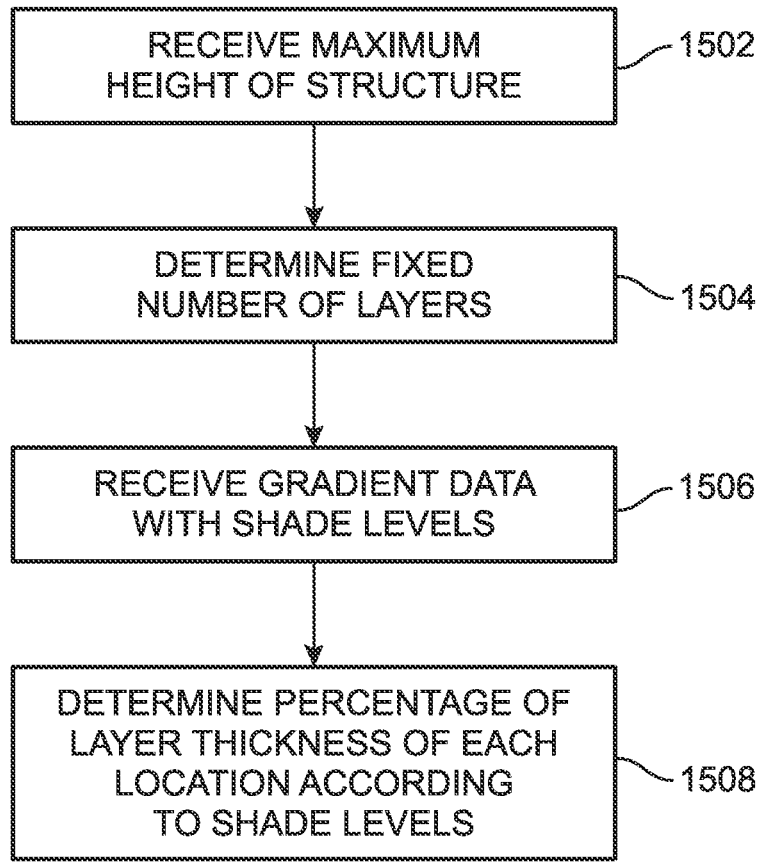
FIG. 15 is a schematic view of a process of printing regions of different heights, according to an embodiment.

FIG. 14-15 illustrate schematic views for an embodiment where a printing system prints a fixed number of layers (N layers) of a structural print material, and where the layers may have different thicknesses, in order to achieve a particular thickness at a given location of a structure. Specifically, FIG. 14 illustrates a schematic view of two printing locations for a 3D structure. At first location 1402, five printed layers 1404 of first height 1450 are printed as determined by shade level 1410 at a corresponding pixel in a greyscale file. At second location 1406, five printed layers 1408 of second height 1452 are printed as determined by shade level 1412 at a corresponding pixel in the same greyscale file. Thus, it may be clearly seen that a printing system prints portions with varying heights by printing a constant number of layers, where each layer has a thickness proportional to the shade level for that location.

FIG. 15 illustrates an embodiment of a process for printing using a fixed number of layers at each location and varying the thickness of those layers to form three-dimensional structures. In step 1502, the printing system receives the maximum height of a structure. This value may be input manually by an operator of the system or could be provided as data along with image information for the greyscale image. Next, in step 1504, the printing system may determine, or otherwise receive, the fixed number of layers. In some cases, this value could be calculated or otherwise determined according to the maximum height and using other parameters to constrain the thickness. In other cases, the fixed number of layers is given as an input to the printing system.

Next, in step 1506, the printing system may receive gradient data with different shade levels. In some cases, the gradient data is greyscale information. However, it may be appreciated that in other embodiments gradient data could be provided as different shades of a non-grey color, such as shades of blue or shades of red. Such gradient data could be treated in a similar manner to greyscale data for the purposes of forming a 3D printed structure.

Finally, in step 1508, the printing system may determine the number of layers to print at each location according to the shade level. Thus, regions with 100% black shade levels may be printed to have the maximum thickness or height of the 3D structure, while regions with less than 100% black shade levels will have less thickness or height when printed. Moreover, this is accomplished by printing each layer with a first thickness in darker regions and each layer with a second thickness that is less than the first thickness in lighter regions.

Some embodiments can include provisions for increasing the precision of printing smooth contoured 3D surfaces. In some embodiments, a printing system can include provisions for correlating a spot color percentage for a given ink with a desired ink layer height. Here, the term 'spot color' may refer to the use of a standardized ink or print material for which various properties (such as color density for a given quantity of ink) are known. In other words, a spot color may also be referred to as a standardized color. In the context discussed in the following embodiment, 'spot color' can refer to clear structural inks as well. In some cases, a known greyscale spot color range (0-100%) may be used for a clear structural ink. However, instead of using variations in spot color percentage to control color density in a layer, the print system may use spot color to control the thickness of one or more structural layers.

Figure 16:
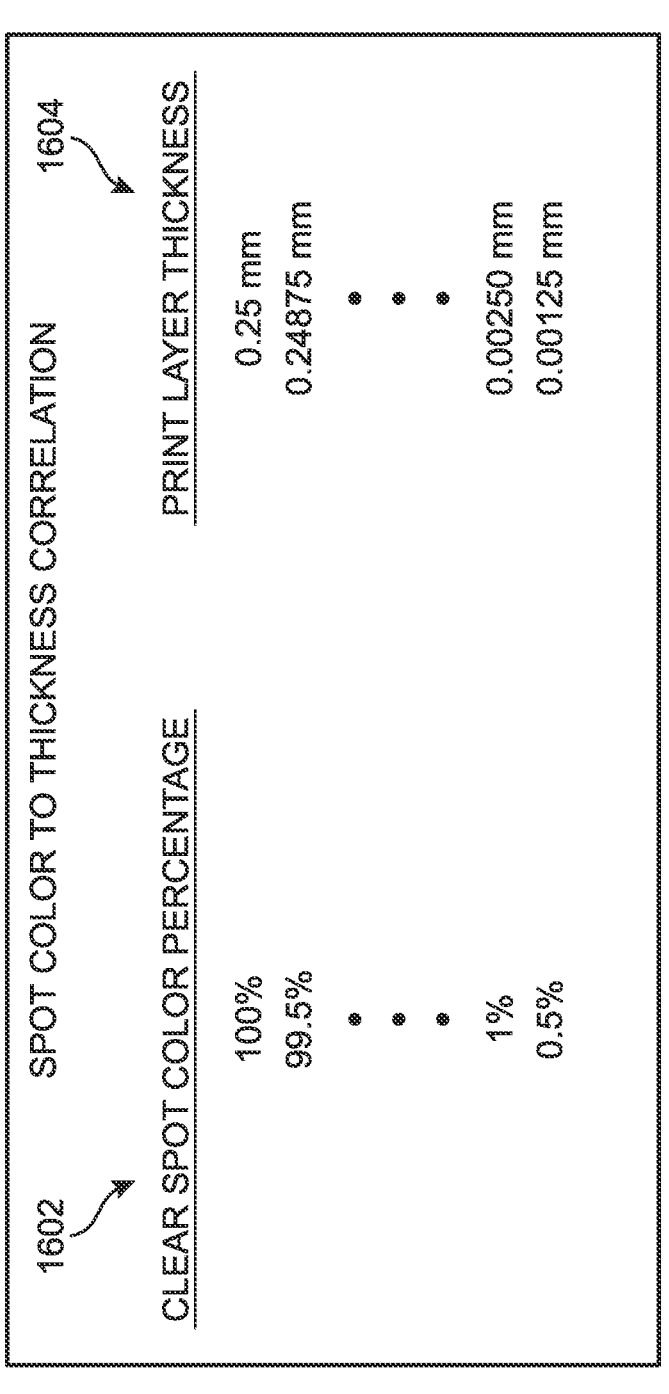
FIG. 16 is a schematic view of a table showing a relationship between spot color percentage and print layer thickness, according to an embodiment.

FIG. 16 illustrates a schematic relationship between a clear (CLR) spot color percentage for a given clear structural ink (columns 1602), and a resulting print layer thickness (column 1604). If provided with the data contained in such a table, a print system can print layers of a wide range of thicknesses by selecting the associated spot color percentage for printing to achieve the desired thickness (alternatively a designer and/or graphics program can provide data with the desired spot color percentages to a printing system to achieved desired thicknesses in the resulting printed object). This may allow for the creation of very smooth contours and height gradients as the print system has very fine and precise control over layer thicknesses.

Figure 17:
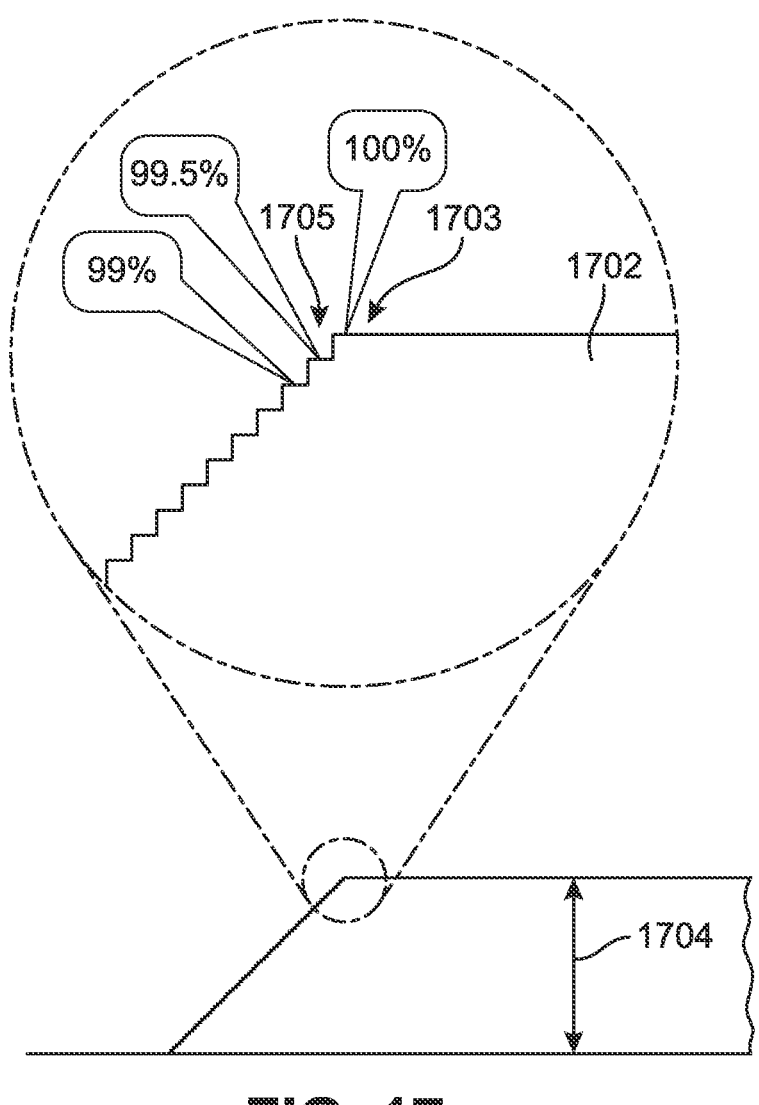
FIG. 17 is a schematic view of a set of layers printed using a set of spot color percentages, according to an embodiment.
Figure 18:
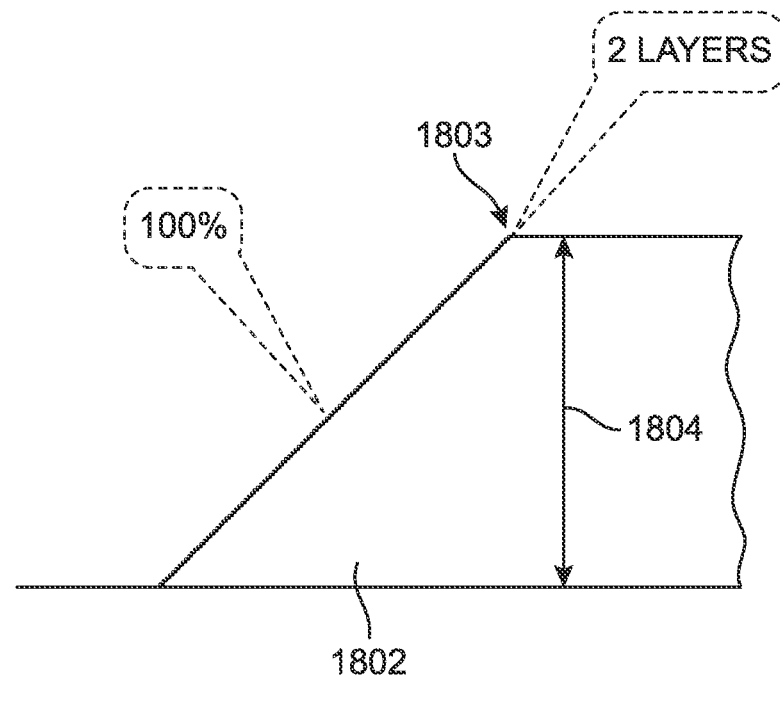
FIG. 18 is a schematic view of a set of layers printed using a set of spot color percentages, according to an embodiment.

For example, FIGS. 17 and 18 illustrate two schematic views of embodiments of printed structures with smoothly varying heights that have been achieved by printing layers according to gradually varying color percentages. In FIG. 17, printed object 1702 has a position 1703 with a maximum height 1704 that corresponds with printing using a 100% spot color designated for the clear structural ink. A position 1705 just adjacent position 1703 has a height that is very slightly less than maximum height 1704 by printing using 99.5% spot color. In FIG. 18, a printed object 1802 has a position 1803 with maximum height 1804 that is twice the maximum height 1704 of FIG. 17. To achieve this thickness, two layers of 100% spot color are printed at position 1803.

In the embodiments of FIGS. 16-18, the corresponding print layer thicknesses are linear in the spot color percentage. In some applications, depending on the type of ink used and/or other properties of the printing system, the print layer thickness may not be linear in the spot color percentage. This may occur because the amount of ink required to linearly vary the color density (which determines the spot color percentages) may result in non-linear variations in height or thickness of printed ink layers. In order to allow a designer to create smoothly varying contours that change in small and regular intervals (layer heights), it may be desirable to find a modified set of spot color percentage values that correspond with a set of regularly spaced thicknesses.

Figure 19:
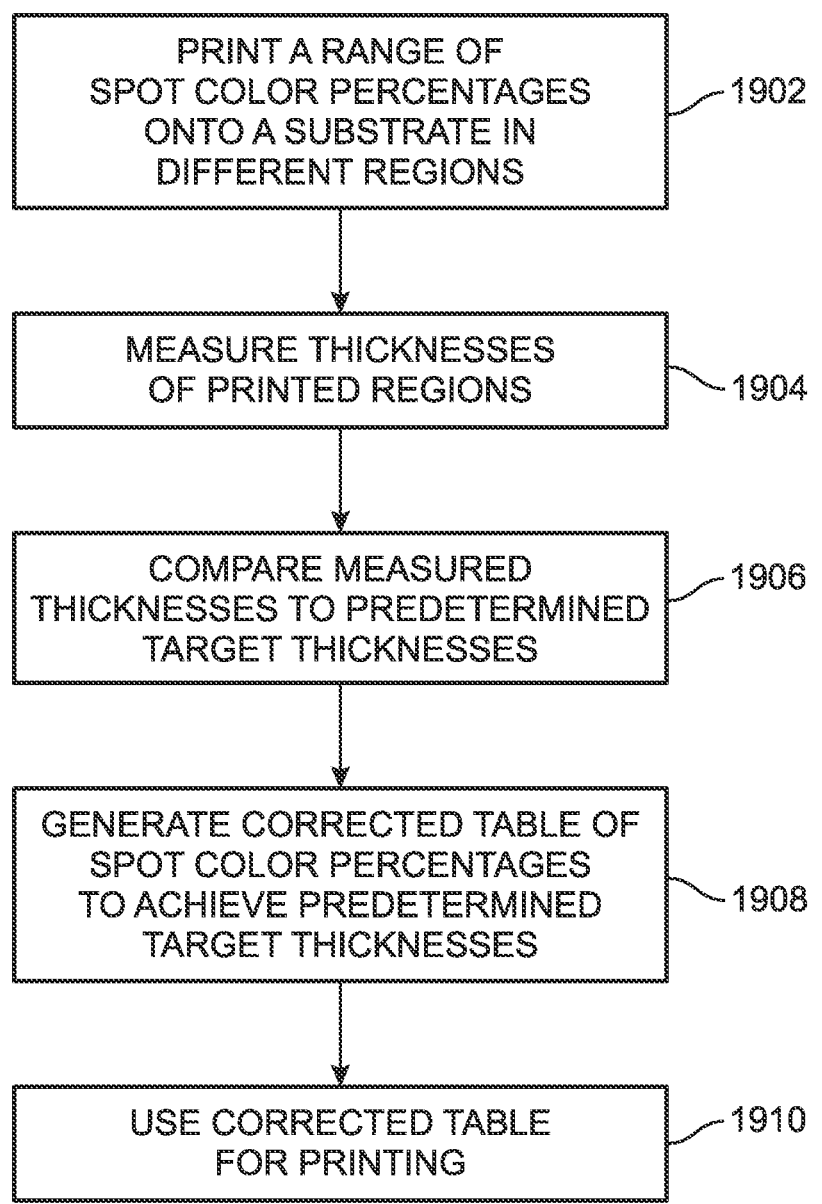
FIG. 19 is a schematic view of a process for generating and using a corrected spot color table for printing.

FIG. 19 illustrates a process for finding a modified (or 'linearized') set of spot color percentages that yield regularly spaced layer thicknesses. At least some of the following steps may be performed by an operator of the printing system, or other system technician. In some cases, one or more of the steps can be performed by the printing system and/or by a separate computing system.

In step 1902, an operator may print a range of spot color percentages to different regions of a substrate. For example, the operator could print 20 spots of ink corresponding to regularly increasing spot color percentages (e.g., 5%, 10%, 15%, etc.). Next, in step 1904, the operator may measure the thicknesses of each region containing ink applied using a different spot color percentage. Exemplary tools and techniques for making such precision measurements can include, but are not limited to: magnetic pull-off gauges, eddy current techniques, ultrasonic techniques as well as other tools and techniques known in the art.

Next, in step 1906, the operator may compare the measured thicknesses to the predetermined target thicknesses, for example using a spreadsheet. In some cases, the predetermined target thickness may be determined according to the assumption that the thickness would vary linearly in height as a function of spot color percentage. In step 1908, the operator may generate a corrected table of spot color percentages for achieving the predetermined target thicknesses (e.g., using a spreadsheet).

Finally, in step 1910, the operator may make sure the corrected or modified table is used during printing. In some embodiments, the modified table could be used on graphic data prior to sending it to the printing system. For example, a graphics program that outputs graphic data for use by the printing system may automatically select spot color percentages for printing using the modified table. In other embodiments, the modified spot color percentages could be incorporated into the software of the printing system (e.g., as logic or as a look-up table stored in a database).

Figure 20:
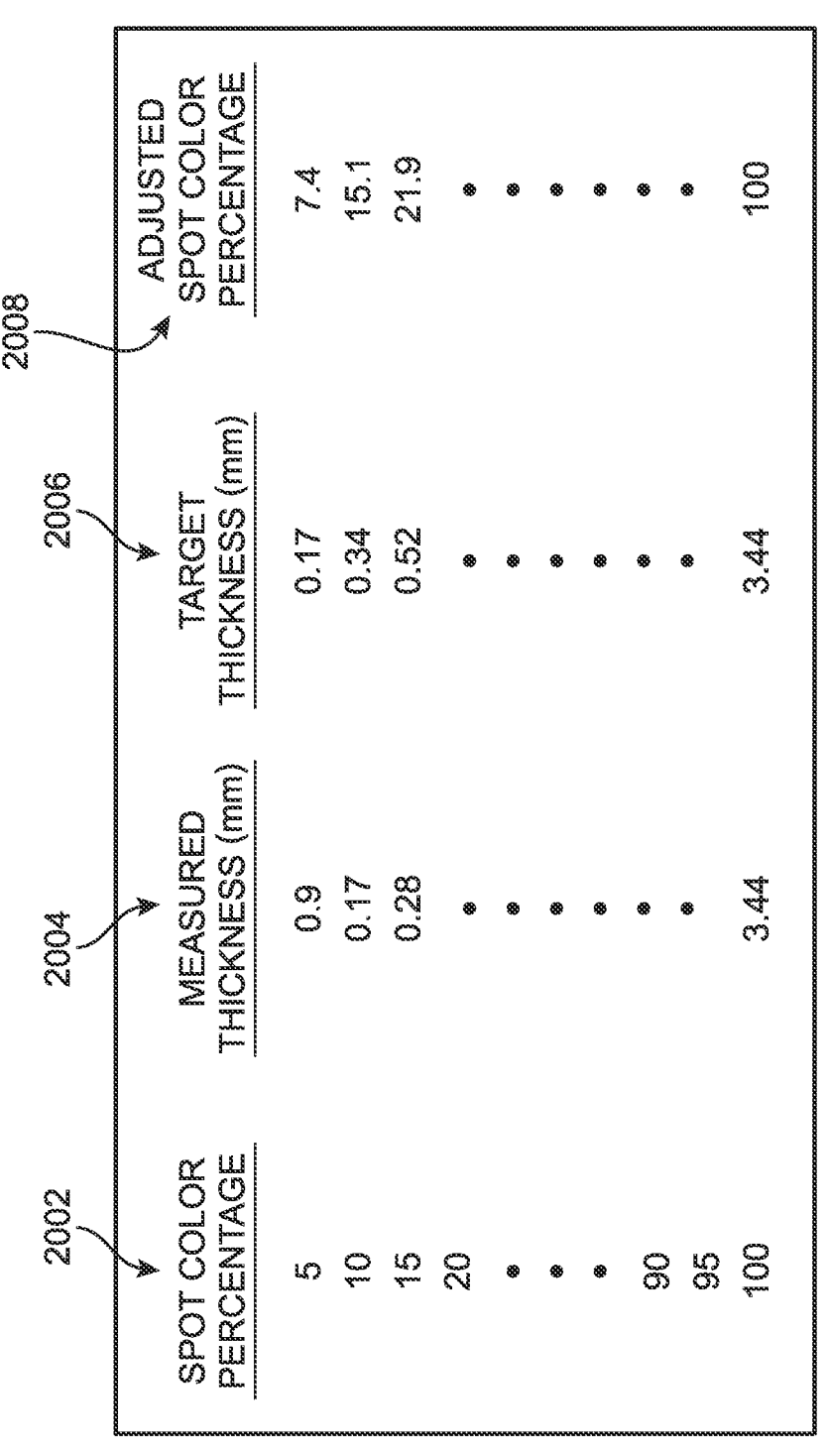
FIG. 20 is a schematic view of a table showing adjusted spot color percentages used to obtain desired target thicknesses.

FIG. 20 illustrates an example of a modified table that provides a correlation between target thickness and an 'adjusted spot color percentage'. In the left-most column 2002 of the table are regular intervals of the spot color percentage from 0 to 100 percent. In the next two columns (column 2004 and column 2006) are the measured layer thickness and target (expected) thickness for those spot color percentages, respectively. Because the measured thicknesses and target thicknesses are different the table includes a final column 2008 with an adjusted spot color percentage. It is the adjusted spot color percentages that should be used to achieve a desired target thickness in the same row, rather than the spot color percentages in the first column 2002. For example, using the table of FIG. 20, in order to print a layer with a target thickness of 0.34 mm (from column 2006) the system should be instructed to print a 15.1% spot color (from the same row in column 2008).

Using the methods described herein a manufacturer can allow a designer to use spot color percentage to net a desired thickness and yield the desired contour with a high level of accuracy. This may be accomplished in an efficient manner by providing print instructions in terms of percentages of known spot colors, for which a printing system, or other software, already has known data (i.e., the amount of ink or print material required to achieve a desired percentage for a given spot color). For example, a graphics program could be configured to output grayscale images with given percentage of a spot color at each pixel that will achieve a desired layer height in a 3D object that corresponds with that pixel.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

The invention claimed is:

1. A method of printing with a printing system, comprising:

filling a first color print material reservoir of a printing device with a structural print material;

receiving from a processing system connected to the printing device reservoir identification information corresponding to the first color print material reservoir;

receiving from the processing system reservoir identification information corresponding to a second color print material reservoir of the printing device filled with a color print material;

receiving from the processing system monochromatic image information with the reservoir identification information corresponding to the first and second color print material reservoirs, wherein the monochromatic image information corresponds to a monochromatic image, wherein the monochromatic image information includes a shade level for each pixel of the monochromatic image;

receiving from the processing system color image information corresponding to a color image;

instructing the printing device to print the monochromatic image information using the first color print material reservoir; and instructing the printing device to print the color image information using the second color print material reservoir, wherein a three-dimensional structure is formed as the printing device prints the monochromatic image information using the structural print material from the first color print material reservoir; and wherein a two-dimensional color layer is formed as the printing device prints the color image information using the color print material from the second color print material reservoir.

2. The method of claim 1, wherein:

each location on an upper surface of the three-dimensional structure has a corresponding pixel in the monochromatic image information; and wherein a height of the three-dimensional structure at each location is determined by the shade level for the corresponding pixel.

3. The method of claim 2, wherein the height of the three-dimensional structure at each location and the shade level for the corresponding pixel have a linear relationship.

4. The method of claim 2, wherein the height of the three-dimensional structure at each location and the shade level for the corresponding pixel have a non-linear relationship.

5. The method of claim 2, wherein the step of instructing the printing device to print the monochromatic image information using the first color print material reservoir comprises calculating an amount of print material to deposit at each location of the upper surface of the three-dimensional structure based on the shade level for the corresponding pixel.

6. The method of claim 1, wherein the printing device prints the color image information after printing the monochromatic image information to create an outer color layer of the three-dimensional structure.

7. The method of claim 1, wherein the printing device prints the color image information before printing the monochromatic image information to create an inner color layer of the three-dimensional structure.

8. The method of claim 7, wherein the printing device receives color image information for a second color image; and wherein the printing device prints the color image information corresponding to the second color image after printing the monochromatic image information to create an outer color layer of the three-dimensional structure.

9. The method of claim 8, wherein the three-dimensional structure and outer color layer are printed onto an article.

10. The method of claim 9, wherein the article is part of an article of footwear.

11. The method of claim 1, wherein the monochromatic image is a greyscale image.

12. The method of claim 1, wherein the method further comprises a step before instructing the printing device to print the monochromatic image information using the first color print material reservoir, wherein the step comprises determining whether the monochromatic image information is intended to be used for printing the three-dimensional structure.

13. The method of claim 12, wherein determining whether the monochromatic image information is intended to be used for printing the three-dimensional structure is based on at least one of a parameter and metadata received with the monochromatic image information.

14. The method of claim 12, wherein determining whether the monochromatic image information is intended to be used for printing the three-dimensional structure is based on whether the monochromatic image is a greyscale image.

* * * * *